(12) United States Patent
Kwon et al.

(10) Patent No.: US 8,441,711 B2
(45) Date of Patent: May 14, 2013

(54) ELECTROPHORETIC DISPLAY DEVICE AND METHOD OF FABRICATING THE SAME

(75) Inventors: Oh-Nam Kwon, Yongin-si (KR); Jong-Kwon Lee, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 800 days.

(21) Appl. No.: 12/314,781

(22) Filed: Dec. 16, 2008

(65) Prior Publication Data

US 2010/0073279 A1   Mar. 25, 2010

(30) Foreign Application Priority Data

Sep. 23, 2008  (KR) .................. 10-2008-0093003
Oct. 27, 2008  (KR) .................. 10-2008-0105413

(51) Int. Cl.
*G02B 26/00*  (2006.01)

(52) U.S. Cl.
USPC .................................. 359/296; 345/107

(58) Field of Classification Search .......... 359/290–291, 359/296, 238, 230; 345/84–85, 107
See application file for complete search history.

(56) References Cited

U.S. PATENT DOCUMENTS

| | | | | |
|---|---|---|---|---|
| 7,436,578 B2 * | 10/2008 | Lee et al. | ................... | 359/296 |
| 2003/0067569 A1 * | 4/2003 | Chang et al. | ................... | 349/106 |
| 2004/0252360 A1 | 12/2004 | Webber et al. | | |
| 2006/0279687 A1 * | 12/2006 | Park et al. | ................... | 349/142 |
| 2008/0043318 A1 | 2/2008 | Whitesides | | |
| 2008/0110862 A1 | 5/2008 | Kim | | |
| 2008/0130091 A1 * | 6/2008 | Lee | ................... | 359/296 |

FOREIGN PATENT DOCUMENTS

| | | |
|---|---|---|
| CN | 101093335 | 12/2007 |
| KR | 10-2007-0121403 | 12/2007 |
| TW | 200537694 | 11/2005 |
| TW | 200834247 | 8/2008 |
| WO | WO 2008/036519 | 3/2008 |

OTHER PUBLICATIONS

"Color In-Plane EPD Using an Anisotropic Scattering Layer", Late-News Poster, 674 SID 04 Digest, T. Endo, et al., May 2004.

* cited by examiner

*Primary Examiner* — Scott J Sugarman
*Assistant Examiner* — Vipin Patel
(74) *Attorney, Agent, or Firm* — McKenna Long & Aldridge LLP

(57) ABSTRACT

A method of fabricating an electrophoretic display device includes forming a gate electrode, a gate line, a data line and a thin film transistor on a substrate having a display region, a non-display region at a periphery of the display region and a cut portion at an outer region of the non-display region; forming a passivation layer over the thin film transistor; forming a pixel electrode connected to the thin film transistor; forming an align mark in the cut portion; attaching an electrophoresis film onto the pixel electrode; forming a color filter layer on the base film using the align mark; wherein the step of forming the align mark is simultaneously performed with one of the step of forming the gate line, the step of forming the data line, and the step of forming the pixel electrode.

29 Claims, 27 Drawing Sheets

ELECTROPHORETIC DISPLAY DEVICE AND METHOD OF FABRICATING THE SAME

The present invention claims the benefit of Korean Patent Application Nos. 10-2008-0093003 and 10-2008-0105413, filed in Korea on Sep. 23, 2008 and Oct. 27, 2008, respectively, all of which are hereby incorporated by reference in their entirety.

BACKGROUND OF THE INVENTION

1. Field of the Invention

The present invention relates to an electrophoretic display device, and more particularly, to an electrophoretic display device and a method of fabricating the same.

2. Discussion of the Related Art

Until recently, display devices have typically included liquid crystal display (LCD) devices, plasma display panels (PDPs) and organic electro-luminescence displays (OLEDs). However, to meet consumer's requirements, various display devices are introduced.

Particularly, properties of a light weight, a thin profile, a high efficiency and a full color moving image displaying are required in the display device. To meet the properties, an electrophoretic display device is suggested. The electrophoretic display device uses a phenomenon that charged particles move to an anode or a cathode. The electrophoretic display device has advantages in a contrast ratio, a response time, a full color display, a cost, mobility and so on. Different from the LCD device, the electrophoretic display device does not require a polarizer, a backlight unit, a liquid crystal layer and so on. Accordingly, the electrophoretic display device has an advantage in production costs.

FIG. 1 is a cross-sectional view illustrating a method of driving an electrophoretic display device according to the related art. In FIG. 1, the related art electrophoretic display device 1 includes a first substrate 11, a second substrate 36 and an ink layer 57 interposed therebetween. The ink layer 57 includes capsules 63, and each capsule 63 has a plurality of white-dyed particles 59 and a plurality of black-dyed particles 61 therein. The white-dyed and black-dyed particles 59 and 61 are negatively and positively charged by a condensation polymerization reaction, respectively.

A plurality of pixel electrodes 28, which are connected to a thin film transistor (not shown), are disposed under the first substrate 11 and in each pixel region (not shown). Each of the pixel electrodes 28 has a positive voltage or a negative voltage. When the capsules formed to have various sizes, a filtering process is performed to obtain capsules having a uniform size.

When a positive or negative voltage is applied to the ink layer 54, the white-dyed particles 59 and the black-dyed particles 61 in the capsules 63 move according to polarities of the applied voltage. When the black-dyed particles 61 move upward, a black color is displayed. When the white-dyed particles 59 move upward, a white color is displayed.

FIG. 2 is a schematic cross-sectional view of the related art electrophoretic display device. In FIG. 2, the related art electrophoretic display device 1 includes a first substrate 11, a second substrate 36 and an ink layer 57 interposed therebetween. The ink layer 57 is disposed between fifth and sixth adhesive layers 51 and 53. Each of the first and second adhesive layers 51 and 53 is formed of a transparent material. A common electrode 55 is disposed under the second adhesive layers 53 to face the ink layer 57. The ink layer 57 includes capsules 63, and each capsule 63 has a plurality of white-dyed particles 59 and a plurality black-dyed particles 61 therein.

The white-dyed and black-dyed particles 59 and 61 are negatively and positively charged, respectively.

The second substrate 36 may be formed of a transparent plastic or a glass, and the first substrate 11 may be formed of an opaque stainless steel. The first substrate 11 may be also formed of a transparent plastic or a glass. A color filter layer 40 of red (R), green (G) and blue (B) colors sub-color filters is formed under an entire surface of the second substrate 36. On the first substrate 11, a gate line (not shown) and a data line (not shown) are formed. The gate and data lines cross each other to define a pixel region P. A thin film transistor (TFT) Tr is formed at a crossing portion of the gate and data lines. The TFT Tr is disposed in each pixel region P. The TFT Tr includes a gate electrode 14, a gate insulating layer 16, a semiconductor layer 18 including an active layer 18a and an ohmic contact layer 18b, a source electrode 20 and a drain electrode 22. The gate and source electrodes are connected to the gate and data lines, respectively, and the gate insulating layer 16 covers the gate electrodes 14. The semiconductor layer 18 is disposed on the gate insulating layer 16 and overlaps the gate electrode 14. The source and drain electrodes 20 and 22 are disposed on the semiconductor layer 18 and spaced apart from each other.

A passivation layer 26 including a drain contact hole 27 is formed over the TFT Tr. The drain contact hole 27 exposes a portion of the drain electrode 22. A pixel electrode 28 is disposed on the passivation layer 26 and in each pixel region P. The pixel electrode 28 is connected to the drain electrode 22 through the drain contact hole 27. The pixel electrode 28 may be formed of a transparent conductive material, for example, indium-tin-oxide (ITO) or indium-zinc-oxide (IZO).

The electrophoretic display device 1 having the above elements uses ambient light, for example, natural light or room electric light, as a light source. The electrophoretic display device 1 can display images by inducing a position change of the white-dyed particles 59 and the black-dyed particles 61 in the capsule 63 depending on a polarity of a voltage applied to the pixel electrode 28.

FIGS. 3A to 3E are cross-sectional views showing a fabricating process for the related art electrophoretic display device. A region where a plurality of pixel regions are defined is referred to as a display region, and a region at a periphery of the display region is referred to as a non-display region.

In FIG. 3A, first and second adhesive layers 7 and 9 are formed on a front surface and a rear surface of a first carrier substrate 5, for example, a glass substrate, respectively. First and second metal thin film substrates 11 and 13 are attached to an outer surface of the first adhesive layer 7 and an outer surface of the second adhesive layer 9, respectively.

Next, an insulating layer (not shown) is formed on an entire surface of the first metal thin film substrate 11. A gate line (not shown) and a data line (not shown) crossing each other to define a pixel region P are formed on the insulating layer. A TFT Tr connected to the gate and data lines is formed in the pixel region P. Although not shown, in the non-display region, a gate pad electrode, which is connected to the gate line, and a data pad electrode, which is connected to the data line, are formed.

A passivation layer 26 is formed over the TFT Tr by coating an organic insulating material. The passviatin layer 26 is patterned to form a drain contact hole 27 exposing a drain electrode (not shown) of the TFT Tr in each pixel region P, a gate pad contact hole (not shown) exposing the gate pad electrode, and a data pad contact hole (not shown) exposing the data pad electrode.

A transparent conductive material layer (not shown) is formed on the passivation layer 26 by depositing a transparent conductive material. The transparent conductive material layer is patterned to form a pixel electrode 28 contacting the drain electrode of the TFT Tr through the drain contact hole, a gate auxiliary pad electrode (not shown) contacting the gate pad electrode through the gate pad contact hole, and a data auxiliary pad electrode (not shown) contacting the data pad electrode through the data pad contact hole. The first metal thin film substrate 11, where array elements, for example, the TFT Tr, the pixel electrode 28, and so on, are formed and the first adhesive layer 7, the first carrier substrate 5, the second adhesive layer 9 and the second metal thin film substrate 13 are stacked, may be referred to as an array substrate 22 for the electrophoretic display device.

Next, in FIG. 3B, third and fourth adhesive layers 32 and 34 are formed on a front surface and a rear surface of a second carrier substrate 30, for example, a glass substrate, respectively. First and second transparent substrates 36 and 38 are attached to an outer surface of the third adhesive layer 32 and an outer surface of the fourth adhesive layer 34, respectively. Each of the first and second transparent substrates 36 and 38 may be flexible.

A color filter layer 40 including sequentially arranged red (R), green (G) and blue (B) colors sub-color filters 40a, 40b and 40c is formed on the first transparent substrate 36. Each of the red (R), green (G) and blue (B) colors sub-color filters 40a, 40b and 40c corresponds to the pixel region P in the array substrate 22. The first transparent substrate 36, where the color filter layer 40 is formed and the third adhesive layer 32, the second carrier substrate 30, the fourth adhesive layer 34 and the second transparent substrate 38 are stacked, may be referred to as a color filter substrate 42 for the electrophoretic display device. On the color filter substrate 42, a black matrix (not shown) corresponding to a border region of the sub-color filters 40a, 40b and 40c may be further formed. The black matrix surrounds each pixel region P.

In FIG. 3C, an electrophoresis film 65 is attached onto the array substrate 22. The electrophoresis film 65 includes fifth and sixth adhesive layers 51 and 53, a common electrode 55 and an ink layer 57. The ink layer 57 is disposed between the fifth and sixth adhesive layers 51 and 53, and the common electrode 55 is disposed on the sixth adhesive layer 53 to face the ink layer 57. The ink layer 57 includes a plurality of capsules 63, and each capsule 63 has a plurality of white-dyed particles 59 and a plurality black-dyed particles 61 therein. The white-dyed and black-dyed particles 59 and 61 are negatively and positively charged by a condensation polymerization reaction, respectively. The fifth adhesive layer 51 is disposed to face the pixel electrode 28 such that the ink layer 57 is positioned between the common electrode 55 and the pixel electrode 28.

In FIG. 3D, the color filter substrate 42 is attached to the array substrate 22 to form a panel. The color filter substrate 42 is disposed to face the electrophoresis film 65.

In FIG. 3E, the first carrier substrate 5 with the first and second adhesive layers 7 and 9 and the second metal thin film substrate 13 is detached from the first metal thin film substrate 11. Also, the second carrier substrate 30 with the third and fourth adhesive layers 32 and 34 and the second transparent substrate 38 is detached from the first transparent substrate 36. As a result, the electrophoretic display device 1 can be obtained.

However, there are disadvantages in the above fabricating process for the related art electrophoretic display device. The fabricating process is very complicated. Namely, the array substrate requires processes of attaching the first and second adhesive layers on the front and rear surfaces of the first carrier substrate, attaching the first and second metal thin film substrates on the first and second adhesive layers, and forming the array elements, for example, the TFT or the pixel electrode, on the first metal thin film substrate attached on the first adhesive layer. Moreover, the array substrate requires processes of attaching the third and fourth adhesive layers on the second carrier substrate, attaching the first and second transparent substrates on the third and fourth adhesive layers, and forming the color filter layer on the first transparent substrate. In addition, unessential elements, for example, the first and second carrier substrates, are detached from the panel.

Furthermore, when unessential elements, for example, the first and second carrier substrates, which are required in a fabricating process for the electrophoretic display device but are not required in end products of the electrophoretic display device, are detached, there is an outer stress. As a result, there is a mis-align problem between the array substrate and the color filter substrate such that a display image quality is degraded.

Furthermore, there is a scratch damage on the first transparent substrate, which is formed of a relatively low hardness material, such as plastic, during attaching and detaching processes. The scratch also causes a display image quality being degraded.

SUMMARY OF THE INVENTION

Accordingly, the present invention is directed to an electrophoretic display device and method of fabricating the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating an electrophoretic display device includes forming a gate electrode, a gate line, a data line and a thin film transistor having a semiconductor layer, a source electrode and a drain electrode on a substrate having a display region, where a plurality of pixel regions are defined, a non-display region at a periphery of the display region and a cut portion at an outer region of the non-display region, the gate and data lines crossing each other to define the pixel regions, the thin film transistor connected to the gate and data lines; forming a gate insulating layer on an entire surface of the substrate including the gate electrode and the gate line; forming a passivation layer over the thin film transistor; forming a pixel electrode in each pixel region on the passivation layer and connected to the drain electrode of the thin film transistor; forming an align mark in the cut portion; attaching an electrophoresis film including an adhesive layer, an ink layer having a charged particle, a common electrode and a base film onto the pixel electrode, the ink layer disposed between the adhesive layer and the base film, the adhesive layer being on the pixel electrode, the charged particle including a negatively-charged sub-particle having a white color and a positively-charged sub-particle having a black color; forming a color filter layer on the base film using the align mark for aligning the color filter layer with the pixel regions, the color filter layer corresponding to the display region; and forming a passivation sheet on the color filter layer and corresponding to the display region, wherein the step of forming the align mark is simultaneously performed with one of the step of forming the gate line, the step of forming the data line, and the step of forming the pixel electrode.

In another aspect, an electrophoretic display device includes a gate line on a substrate having a display region, where a plurality of pixel regions are defined, and a non-display region at a periphery of the display region; a gate pad electrode in the non-display region on the substrate and connected to an end of the gate line; a gate insulating layer on an entire surface of the substrate including the gate line; a data line on the gate line and crossing the gate line to define the pixel regions; a thin film transistor including a gate electrode connected to the gate line, a semiconductor layer on the gate insulating layer and corresponding to the gate electrode, a source electrode connected to the data line and disposed on the semiconductor layer and a drain electrode spaced apart form the source electrode and disposed on the semiconductor layer; a data pad electrode in the non-display region on the gate insulating layer and connected to an end of the data line; a passivation layer including a drain contact hole, a gate pad contact hole and a data pad contact hole over the thin film transistor, the passivation layer has a first thickness in the display region and a second thickness smaller than the first thickness in the non-display region, the drain contact hole, the gate pad contact hole and the data pad contact hole exposing the drain electrode, the gate pad electrode and the data pad electrode, respectively, the passivation layer includes a double-layered structure having an organic insulating material layer and an inorganic insulating material layer, the organic insulating material layer in the display region is thicker than the organic insulating material layer in the non-display region; a pixel electrode on the passivation layer in each pixel region and contacting the drain electrode through the drain contact hole; an electrophoresis film on the pixel electrode and corresponding to the display region; a color filter layer on the electrophoresis film; and a passivation sheet on the color filter layer.

In another aspect, an electrophoretic display device includes a gate line on a substrate having a display region, where a plurality of pixel regions are defined, and a non-display region at a periphery of the display region; a gate pad electrode in the non-display region on the substrate and connected to an end of the gate line; a gate insulating layer on an entire surface of the substrate including the gate line; a data line on the gate line and crossing the gate line to define the pixel regions; a thin film transistor including a gate electrode connected to the gate line, a semiconductor layer on the gate insulating layer and corresponding to the gate electrode, a source electrode connected to the data line and disposed on the semiconductor layer and a drain electrode spaced apart form the source electrode and disposed on the semiconductor layer; a data pad electrode in the non-display region on the gate insulating layer and connected to an end of the data line; a passivation layer including a drain contact hole, a gate pad contact hole and a data pad contact hole over the thin film transistor, the passivation layer has a first thickness in the display region and a second thickness smaller than the first thickness in the non-display region, the drain contact hole, the gate pad contact hole and the data pad contact hole exposing the drain electrode, the gate pad electrode and the data pad electrode, respectively, the passivation layer includes a triple-layered structure having a first inorganic insulating material layer, an organic insulating material layer and a second inorganic insulating material layer in the display region; a pixel electrode on the passivation layer in each pixel region and contacting the drain electrode through the drain contact hole; an electrophoresis film on the pixel electrode and correspond-ing to the display region; a color filter layer on the electrophoresis film; and a passivation sheet on the color filter layer.

In another aspect, a method of fabricating an electrophoretic display device includes forming a thin film transistor on a substrate including a display region, non-display region at a periphery of the display region and a cut region at an outer side of the non-display region; forming a passivation layer covering the thin film transistor; forming a pixel electrode on the passivation layer and connected to the thin film transistor; attaching an electrophoresis film including an adhesive layer, an ink layer having a charged particle, a common electrode and a base film such that the adhesive layer contacts the pixel electrode; and directly forming a color filter layer on the electrophoresis film.

In another aspect, an electrophoretic display device includes a thin film transistor on a substrate including including a display region, non-display region at a periphery of the display region and a cut region at an outer side of the non-display region, the thin film transistor positioned in the display region; a passivation layer covering the thin film transistor and having a first thickness in the display region and a second thickness, which is smaller than the first thickness, in the non-display region; a pixel electrode on the passivation layer and connected to the thin film transistor, the pixel electrode perfectly covering the thin film transistor; an electrophoresis film attached to the pixel electrode and covering the display region; and a color filter layer formed on the electrophoresis film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

In an electrophoretic display device, both a film type ink layer and a color filter layer are formed on an array substrate where a TFT is formed.

FIGS. 4A to 4H are cross-sectional views showing a fabricating process for one pixel region of an electrophoretic display device according to a first embodiment of the present invention, and FIGS. 5A to 5H are cross-sectional views showing a fabricating process for a gate pad region of an electrophoretic display device according to a first embodiment of the present invention. FIGS. 6A to 6H are cross-sectional views showing a fabricating process for a data pad region of an electrophoretic display device according to a first embodiment of the present invention, and FIGS. 7A to 7C are plan views showing a fabricating process for an electrophoretic display device according to a first embodiment of the present invention. A pixel region P, where a pixel electrode, a TFT and so on is formed, includes a switching region TrA, where the TFT is formed, and a storage region StgA, where a storage capacitor is formed. The pixel region P is defined in a display region DA. A gate pad region GPA, where a gate pad electrode is formed, and a data pad region DPA, where a data pad electrode is formed, are defined in a non-display region at a periphery of the display region.

Figure 1:
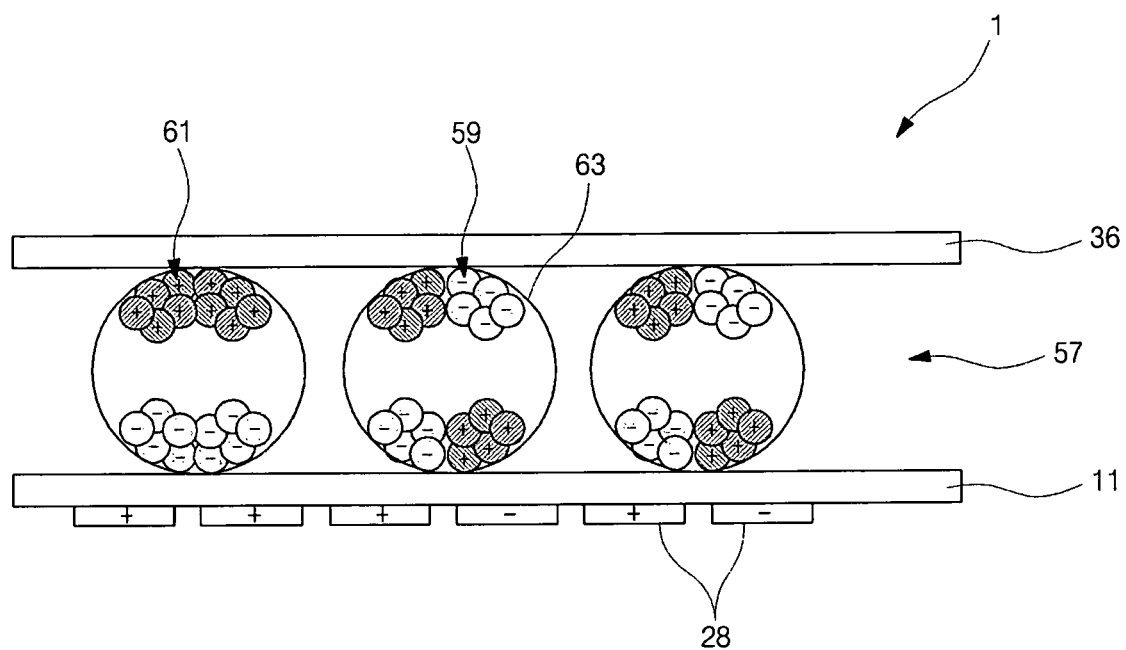
FIG. 1 is a cross-sectional view illustrating a method of driving an electrophoretic display device according to the related art.
Figure 2:
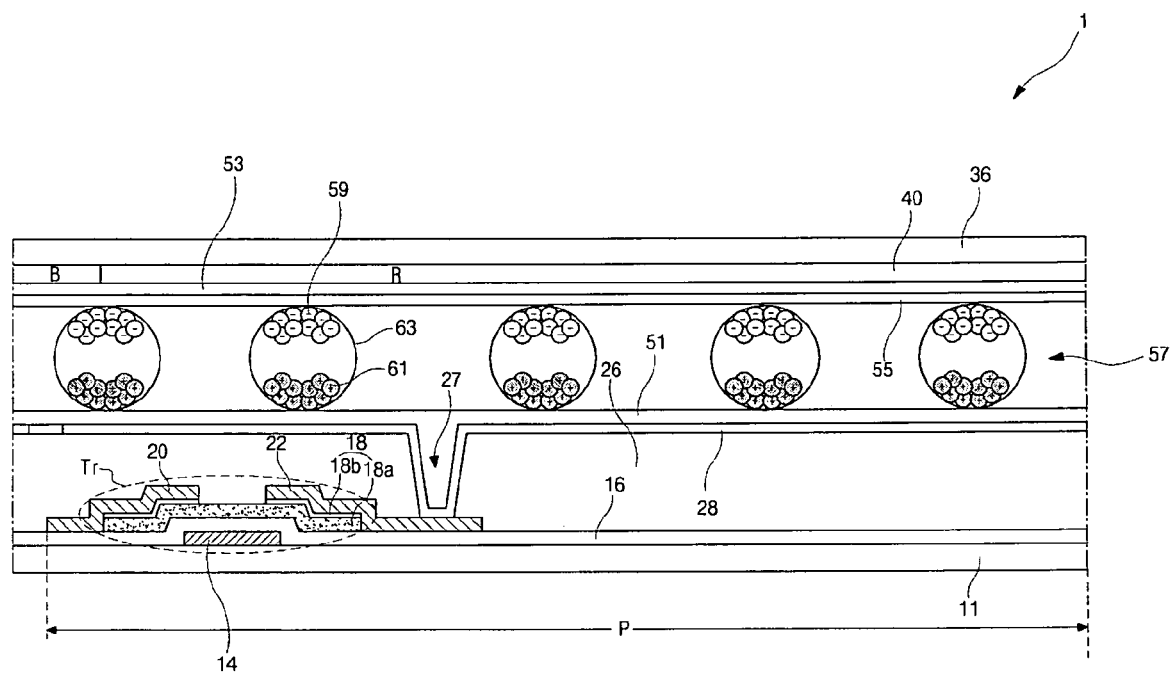
FIG. 2 is a schematic cross-sectional view of the related art electrophoretic display device.
Figure 3A:
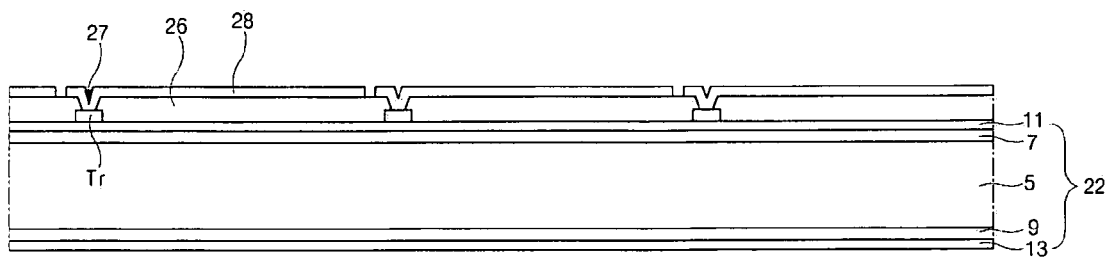
FIGS. 3A to 3E are cross-sectional views showing a fabricating process for the related art electrophoretic display device.
Figure 3B:
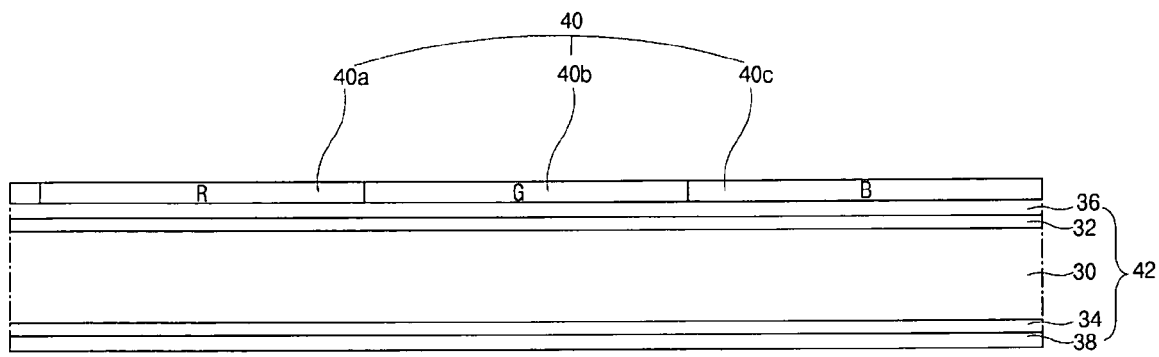
Figure 3C:
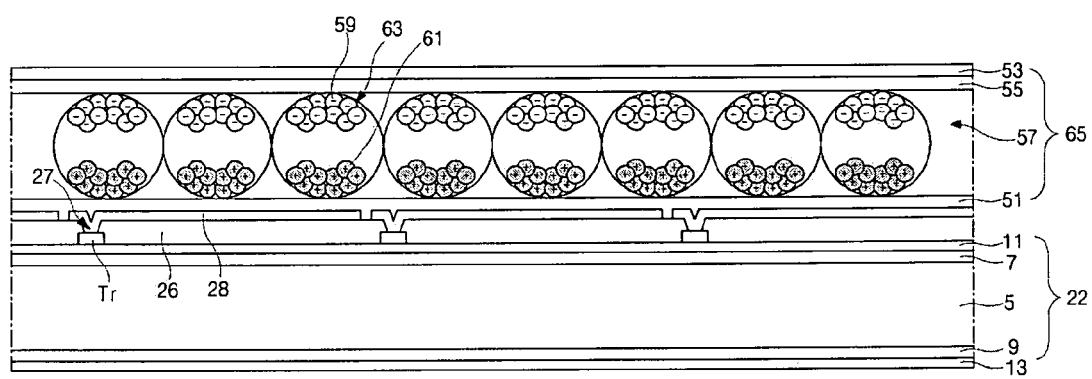
Figure 3D:
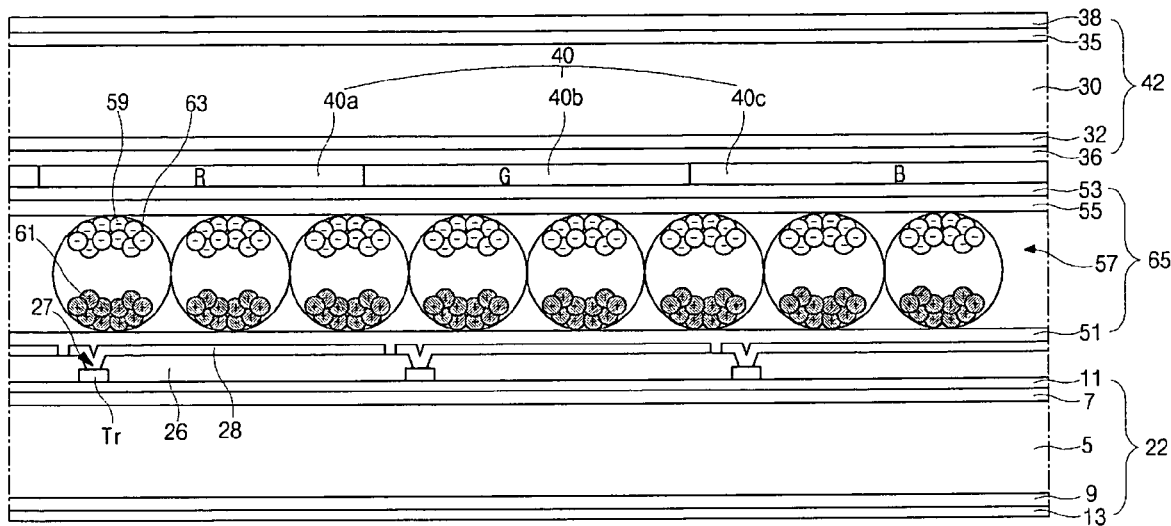
Figure 3E:
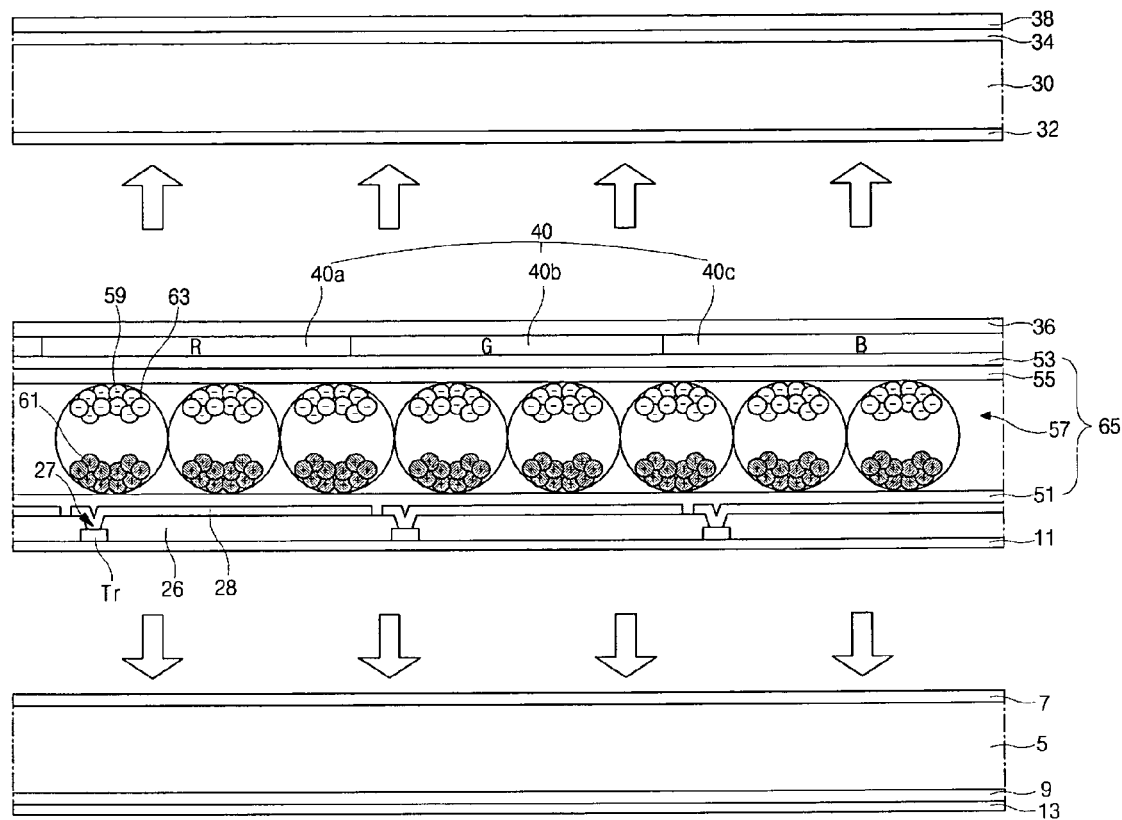
Figure 4A:
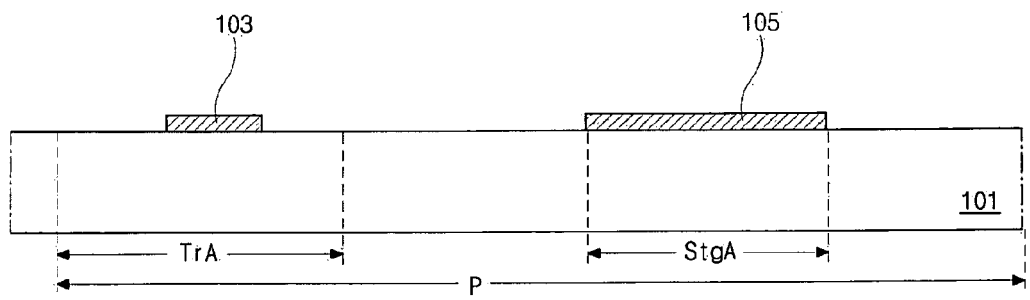
FIGS. 4A to 4H are cross-sectional views showing a fabricating process for one pixel region of an electrophoretic display device according to a first embodiment of the present invention.
Figure 5A:
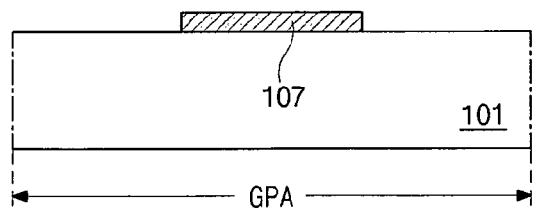
FIGS. 5A to 5H are cross-sectional views showing a fabricating process for a gate pad region of an electrophoretic display device according to a first embodiment of the present invention.
Figure 6A:
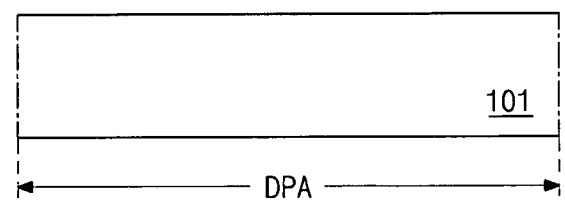
FIGS. 6A to 6H are cross-sectional views showing a fabricating process for a data pad region of an electrophoretic display device according to a first embodiment of the present invention.
Figure 7A:
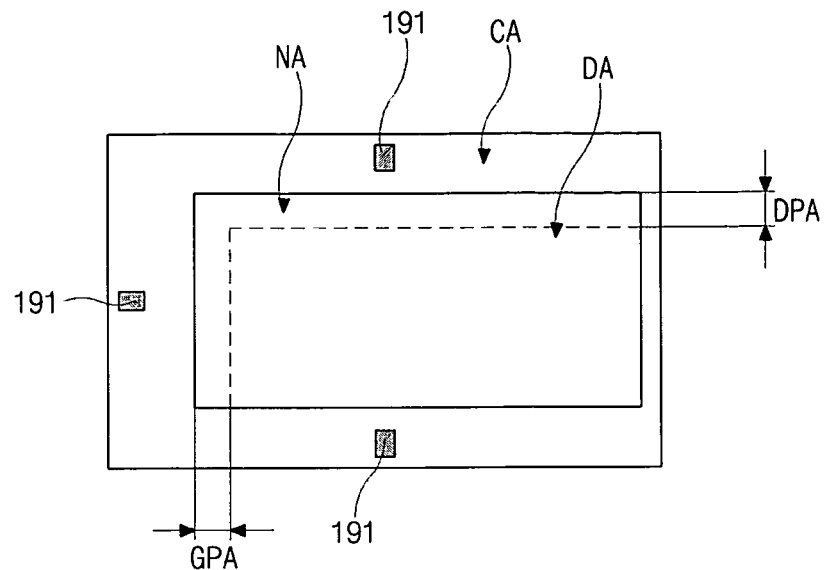
FIGS. 7A to 7C are plan views showing a fabricating process for an electrophoretic display device according to a first embodiment of the present invention.
Figure 7B:
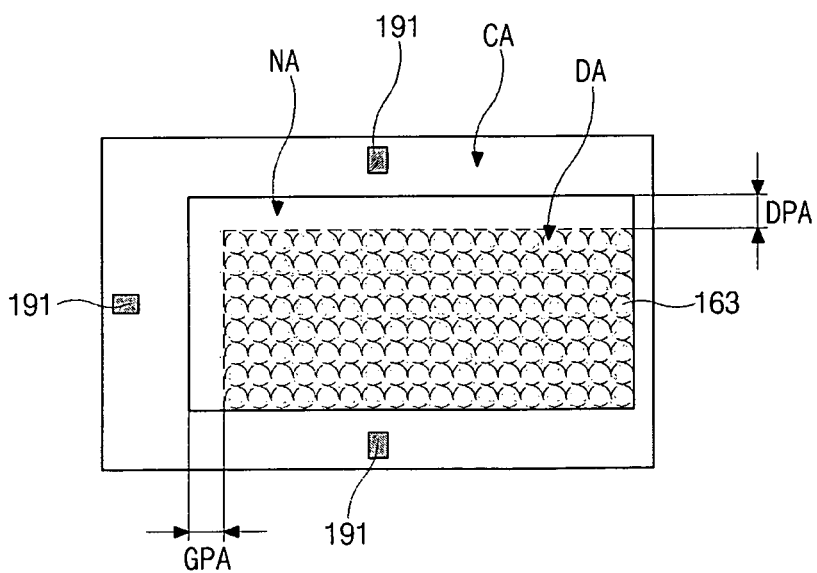
Figure 7C:
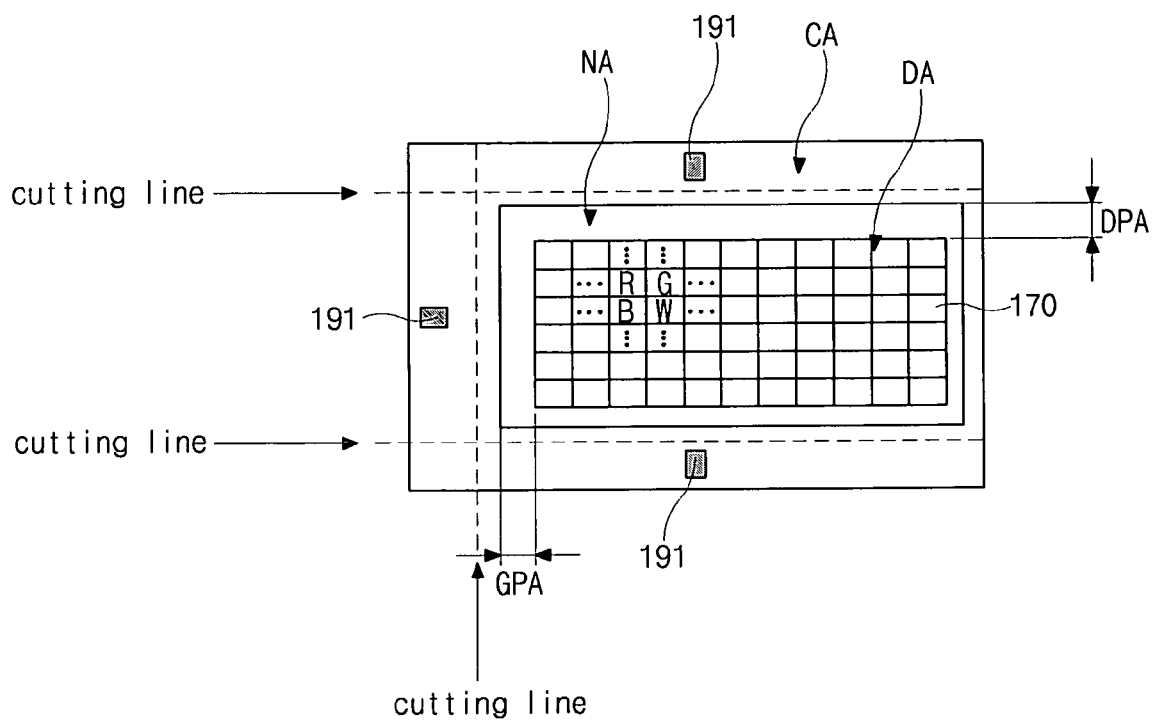

In FIGS. 4A, 5A and 6A, a first metallic material is deposited on an insulating substrate 101, for example, a glass substrate or a plastic substrate, to form a first metal layer (not shown). The first metallic material includes one of aluminum (Al), Al alloy (AlNd), copper (Cu), Cu alloy, chrome (Cr) and titanium (Ti) alloy. The first metallic material layer is patterned using a mask process to form a gate line (not shown), a gate electrode 103 in the switching region TrA, a first storage electrode 105 in the storage region StgA, and a gate pad electrode 107 in the gate pad region GPA. The mask process includes a step of forming a photoresist (PR) layer, a step of exposing the PR layer using a mask, a step of developing the exposed PR layer to form a PR pattern, a step of etching the the first metallic material layer to form a desired metal pattern and a step of striping the PR pattern. The gate line extends along a direction, and the gate electrode 103 is connected to the gate line. The first storage electrode 105 may be a portion of the gate line. When a common line (not shown) is formed to be parallel to the gate line, the first storage electrode 105 may be a portion of the common line. The gate pad electrode 107 is connected to an end of the gate line. Each of the gate line, the gate electrode 103, the first storage electrode 105 and the gate pad electrode 107 may have a double-layered structure. The double-layered structure may be a stacked AlNd/molybdenum layer or a stacked Ti alloy/Cu layer. In FIGS. 4A, 5A and 6A show the gate line, the gate electrode 103, the first storage electrode 105 and the gate pad electrode 107 having a single-layered structure.

Referring to FIG. 7A, an align mark 191 is formed in an align mark region CA, which will be removed by cutting process, by a pattering process for the first metal layer. The align mark 191 is used for exact aligning a color filter layer with the pixel region P. The non-display region, where the gate pad electrode 107 (of FIG. 5A) and a data pad (not shown) are formed, is positioned between the display region DA, where the pixel region P is disposed, and the align mark region CA. The align mark 191 is formed in a first cut region CA adjacent to the gate pad region GPA, a second cut region CA adjacent to the data pad region DPA and a third cut region CA facing the first region. The align mark 191 is positioned an outer region of a cutting line. Since the color filter layer includes red, green and blue colors sub-color filters, each of the first to third regions of the align mark region CA include at least one align mark 191. The align mark 191 may be formed in another process.

Figure 4B:
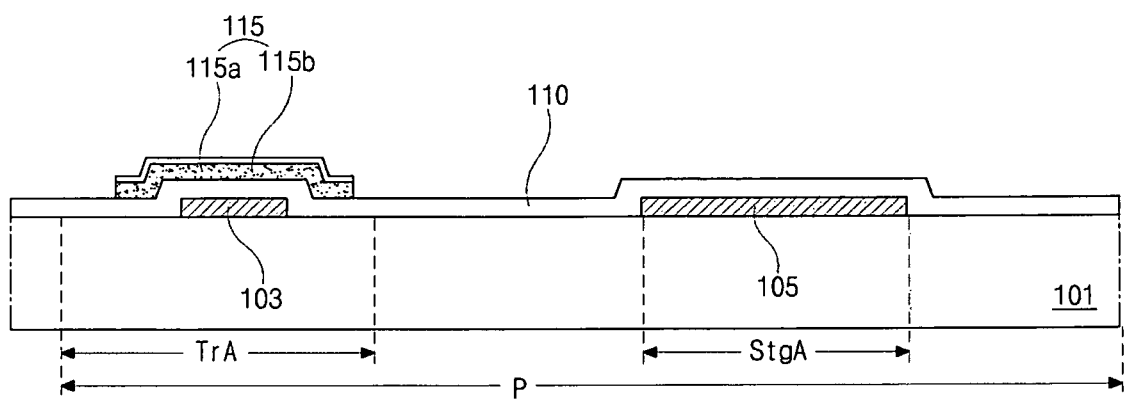
Figure 5B:
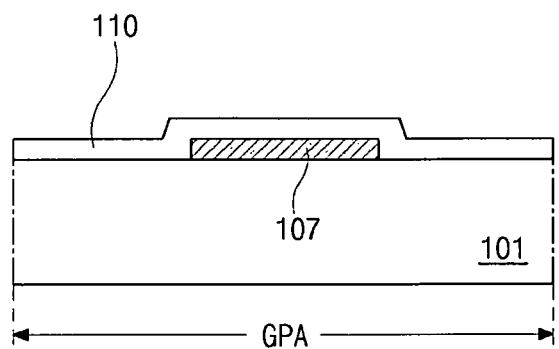
Figure 6B:
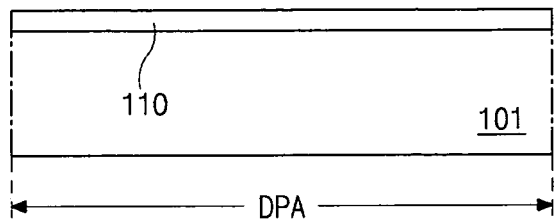

In FIGS. 4B, 5B and 6B, a gate insulating layer 110 is formed on an entrie surface including the gate line, the gate electrode 103, the first storage line 105 and the gate pad electrode 107 by depositing an inorganic insulating material such as silicon oxide ($SiO_2$) and silicon nitride (SiNx). Next, an intrinsic amorphous silicon layer (not shown) of intrinsic amorphous silicon and an impurity-doped amorphous silicon layer (not shown) of impurity-doped amorphous silicon are sequentially formed on the gate insulating layer 110. The intrinsic amorphous silicon layer and the impurity-doped amorphous silicon layer are patterned using a mask process to form an active layer 115a of intrinsic amorphous silicon and an impurity-doped amorphous silicon pattern 115b of impurity-doped amorphous silicon. The active layer 115a and the impurity-doped amorphous silicon pattern 115b correspond to the gate electrode 103.

Figure 4C:
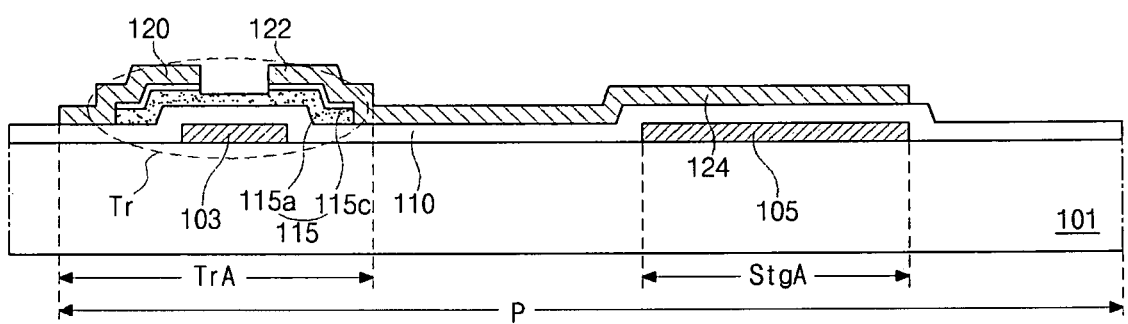
Figure 5C:
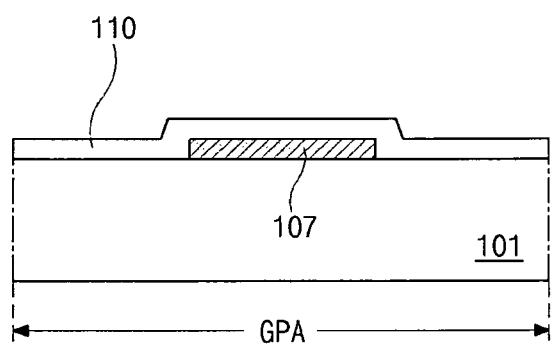
Figure 6C:
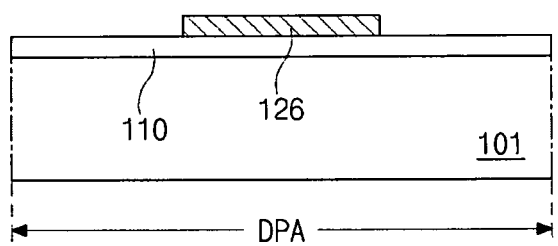

In FIGS. 4C, 5C and 6C, a second metallic material is deposited on the active layer 115a, the impurity-doped amorphous silicon pattern 115a (of FIG. 4B) and the gate insulating layer 110 to form a second metal layer (not shown). The second metallic material includes one of molybdenum (Mo), copper (Cu), titanium (Ti) alloy and Al alloy (AlNd). The second metal layer may be a double-layered or triple-layered structure. For example, the double-layered structure of the second metal layer may be a stacked Ti alloy/Cu, and the triple-layered structure of the second metal layer may be a stacked Mo/AlNd/Mo. In FIGS. 4C, 5C and 6C show the second metal layer having a single-layered structure.

The second metal layer (not shown) is patterned to form a data line (not shown), a source electrode 120 in the switching region TrA, a drain electrode 122 in the switching region TrA, a second storage electrode 124 in the storage region StgA and a data pad electrode 126 in the data pad region DPA. The data line crosses the gate line to define the pixel region P. The source and drain electrodes 120 and 122 are disposed on the impurity-doped amorphous silicon pattern 115b in the switching region TrA and spaced apart from each other. The source electrode 120 is connected to the data line, and the second storage electrode 124 is connected to the drain electrode 122. The data pad electrode 126 is disposed on the gate insulating layer 110 and connected to an end of the data line.

Then, an exposed portion of the impurity-doped amorphous silicon pattern 115a between the source and drain electrodes 120 and 122 is removed by a dry-etching process such that a portion of the active layer 115a is exposed through a space of the source and drain electrodes 120 and 122. An ohmic contact layer 115c is formed under the source and drain electrodes 120 and 122. The active layer 115a and the ohmic contact layer 115c constitute a semiconductor layer 115.

On the other hand, if the align mark 191 (of FIG. 7A) is not formed in a process of forming the gate line and the gate electrode 103, the align mark 191 may be formed on the gate insulating layer 110 in a process of forming the data line, the source electrode 120 and the drain electrode 122. In this case, the align mark is also positioned in the first to third regions of the align mark region CA.

Although the semiconductor layer 115 and the source and drain electrodes 120 and 122 are formed by different mask process from each other, they may be formed by a single mark process. In more detail, the intrinsic amorphous silicon layer, the impurity-doped amorphous silicon layer and the second metal layer are sequentially formed on the gate insulating layer 110. Then, the intrinsic amorphous silicon layer, the impurity-doped amorphous silicon layer and the second metal layer are sequentially formed on the gate insulating layer 110 are patterned using a single mark process with a refraction exposing method or a half-tone exposing method to form PR patterns having different thicknesses. The intrinsic amorphous silicon layer, the impurity-doped amorphous silicon layer and the second metal layer are etched using the PR patterns as an etching mask. In this case, there are semiconductor patterns, each of which is formed of the same material as the semiconductor layer, under the data line and the data pad electrode. Moreover, when the align mark is formed in this process, there are also the semiconductor pattern under the align mark.

Figure 4D:
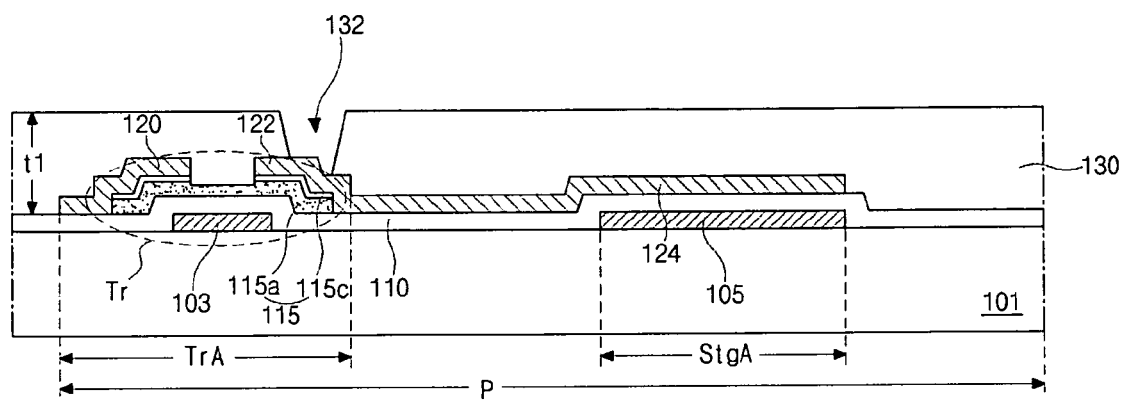
Figure 5D:
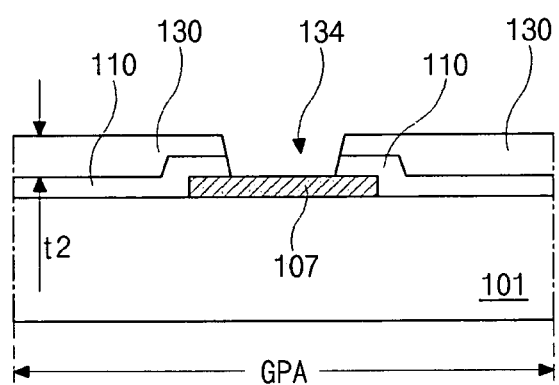
Figure 6D:
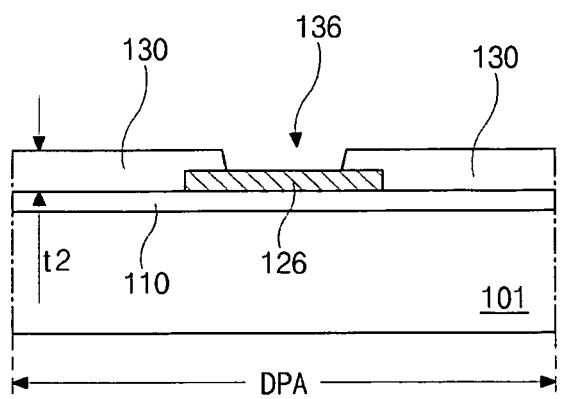

In FIGS. 4D, 5D and 6D, a passivation layer 130 is formed on the data line, the source and drain electrodes 120 and 122, the second storage electrode 124 and the data pad electrode 126 by coating an organic insulating material such as photo-acryl and benzocyclobutene (BCB). The passivation layer 130 has a flat top surface. The passivation layer 130 is patterned using a mask process with a refractive exposing method or a half-tone exposing method to form a drain contact hole 132, a gate pad contact hole 134 and a data pad contact hole 136. The drain contact hole 132, the gate pad contact hole 134 and the data pad contact hole 136 expose the drain electrode 122, the gate pad electrode 107 and the data pad electrode 126, respectively. In addition, the passivation layer 130 in the pixel region P has a first thickness t1, while the passivation layer 130 in the non-display region NA (of FIG. 7A) including the gate pad region GPA and the data pad region DPA has a second thickness t2 smaller than the first thickness t1. The passivation layer 130 may be patterned by two mask processes including a blank shot using a stepper type exposing apparatus. The passivation layer 130 is formed of an organic insulating material to minimize a parasitic capacitance and obtain a flat top surface. For example, the parasitic capacitance may be generated between the first storage electrode 105 and the pixel electrode and between the second storage electrode 124 and the pixel electrode.

As mentioned above, the passivation layer 130 in the display region DA has a difference in a thickness from the passivation layer 130 in the non-display region NA. The first thickness t1 of the passivation layer 130 in the display region DA is greater than the second thickness t2 of the passivation layer 130 in the non-display region Na. (t1>t2) On the other hand, a gate auxiliary pad electrode and a data auxiliary data electrode will be formed on the passivation layer 130 and contact the gate and data pad electrodes 107 and 126 through the gate and data pad contact holes 134 and 136, respectively. For a connection between each of the gate auxiliary pad electrode and the data auxiliary pad electrode and an external driving circuit substrate (not shown), a tape automated bonding (TAB) process is performed. In this case, each of the gate auxiliary pad electrode and the data auxiliary pad electrode contacts a tape carrier package (TCP) film through an anisotropic conductive film (ACF) including a conductive ball (not shown). The greater depth each of the gate auxiliary pad electrode and the data auxiliary pad electrode has, the greater diameter the conductive ball in the ACF has. Unfortunately, the conductive balls in adjacent gate pad contact holes or adjacent data pad contact holes may contact each other such that there are electrical short-circuit problems. When the passivation layer 130 in the non-display region NA including the gate pad region GPA and the data pad region DPA has a relatively small thickness, the conductive ball in the ACF has a relatively small diameter such that the electrical short-circuit problems can be prevented. Moreover, by increasing the thickness of the passivation layer 130 in the display region DA, a parasitic capacitance, for example, induced between the pixel electrode and the second storage electrode 124, can be minimized. Accordingly, in the present invention, the first thickness t1 of the passivation layer 130 in the display region DA is greater than the second thickness t2 of the passivation layer 130 in the non-display region NA. (t1>t2).

Figure 8A:
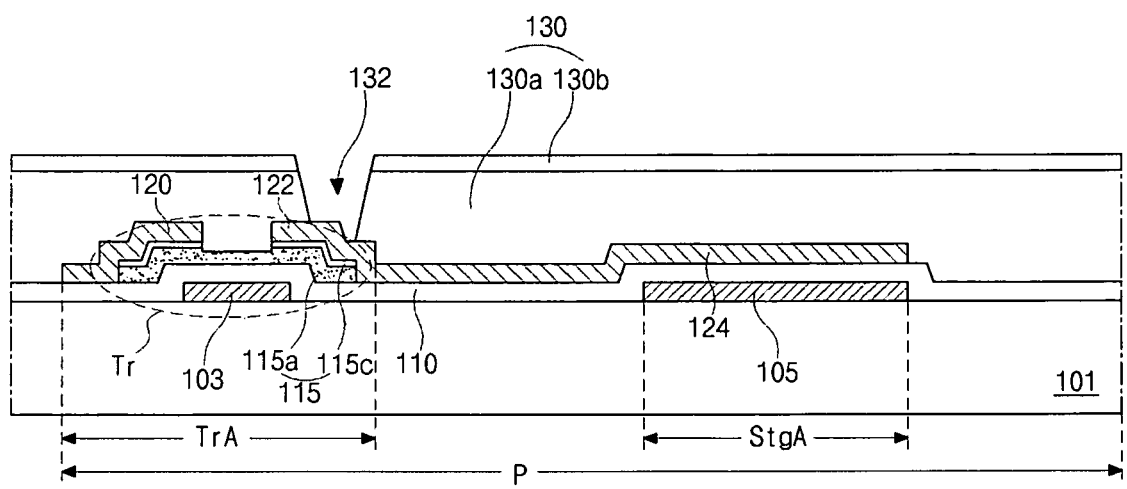
FIGS. 8A to 8C are cross-sectional views respectively showing a fabricating process for a passivation layer in a pixel region, a gate pad region and a data pad region of an electrophoretic display device according to a second embodiment of the present invention.
Figure 8B:
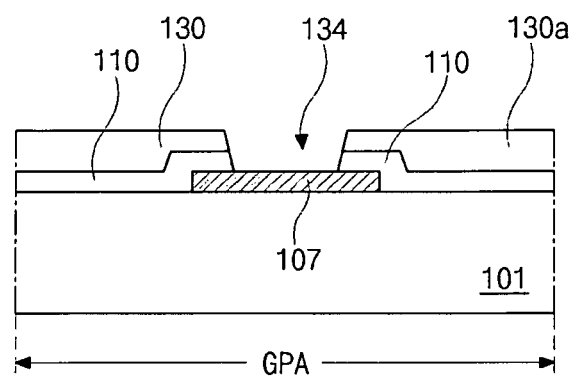
Figure 8C:
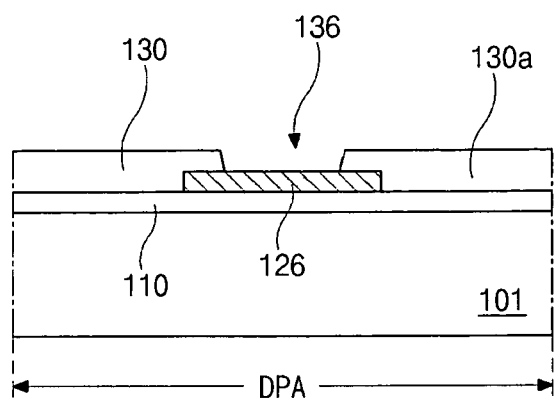
Figure 9A:
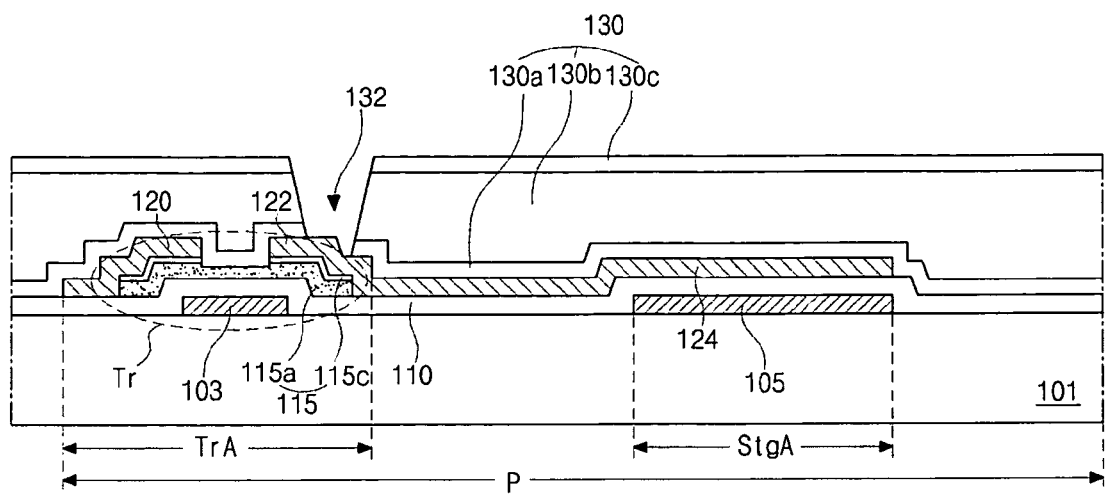
FIGS. 9A to 9C are cross-sectional views respectively showing a fabricating process for a passivation layer in a pixel region, a gate pad region and a data pad region of an electrophoretic display device according to a third embodiment of the present invention.
Figure 9B:
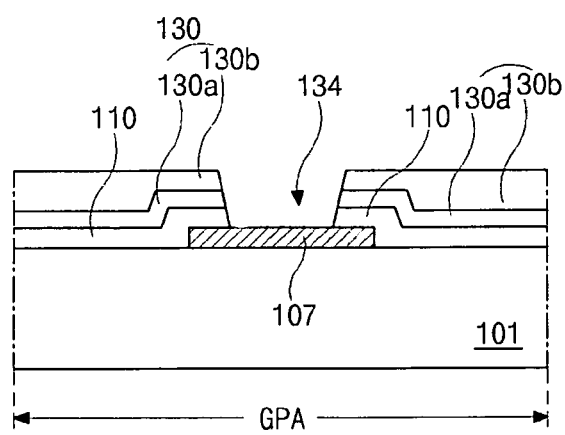
Figure 9C:
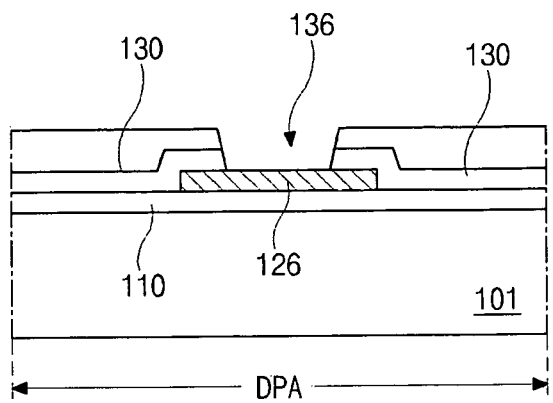

When the passivation layer 130 has a single layered-structure of the organic insulating material such as photo-acryl or BCB, as mentioned above, an exposing process in the mask process is directly performed onto the organic insulating material layer because of their photosensitive property. However, the passivation layer 130 may have a double-layered structure or a triple-layered structure, as shown in FIGS. 8A to 8C and 9A to 9C. FIGS. 8A to 8C are cross-sectional views respectively showing a fabricating process for a passivation layer in a pixel region, a gate pad region and a data pad region of an electrophoretic display device according to a second embodiment of the present invention, and FIGS. 9A to 9C are cross-sectional views respectively showing a fabricating process for a passivation layer in a pixel region, a gate pad region and a data pad region of an electrophoretic display device according to a third embodiment of the present invention.

In FIGS. 8A to 8C, when the passivation layer 130 has a double-layered structure, an organic insulating material layer 130a and an inorganic insulating material layer 130b are stacked. In FIGS. 9A to 9C, when the passivation layer 130 has a triple-layered structure, a first inorganic insulating material layer 130a, an organic insulating material layer 130b and a second inorganic insulating material layer 130c are stacked. The organic insulating material layer includes one of photo-acryl and BCB, and the inorganic insulating material layer includes one of silicon oxide and silicon nitride.

For example, in FIGS. 9A to 9C, the passivation layer 130 has an upper layer of an inorganic insulating material. Since the inorganic insulating material does not have a photosensitive property, exposing and developing processes in the mask process can not be directly performed onto the inorganic insulating material layer. In this case, a PR layer (not shown) of a PR material, which has a photosensitive property, is formed on the inorganic insulating material layer, and the PR layer is exposed and developed by a refractive exposing process or a half-tone exposing process to form a first PR pattern (not shown) in the display region DA and a second PR pattern (not shown) in the non-display region NA, which has a thickness smaller than the first PR pattern,. Then, the second inorganic insulating material layer 130c of an inorganic insulating material, the organic insulating material layer 130b and the first inorganic insulating material layer 130a of an inorganic insulating material are patterned using the first and second PR patterns as a patterning mask to expose the gate pad electrode 107 and the data pad electrode 126. Next, the second PR pattern in the non-display region NA is removed by an ashing process such that a portion of the second inorganic insulating material layer 130c under the second PR pattern is exposed. The exposed portion of the second inorganic insulating material layer 130c is etched such that the passivation layer 130 in the non-display region NA has a double-layered structure of the first inorganic insulating material layer 130a and the organic insulating material layer 130b. Namely, the second inorganic insulating material layer 130c in the non-display region NA is completely removed, and the organic insulating material layer 130b has a reduced thickness.

The passivation layer 130 has the above double-layered structure or the above triple-layered structure is to improve an adhesive strength between the pixel electrode, which will be formed on the passivation layer 130, and the passivation layer 130 and improve properties of the TFT Tr. Since an adhesive strength between the organic insulating material and a conductive material is less than both between the organic insulating material and the inorganic insulating material and between the inorganic insulating material and the conductive material, an adhesive strength between the pixel electrode of a conductive material and the passivation layer 130 is improved by an inorganic insulating material layer positioned between the organic insulating material layer and the conductive material layer. Moreover, when the active layer 115a, a portion of which is exposed between the source and drain electrodes 120 and 122, contacts an organic insulating material layer, there is a bad interface property such that properties of the TFT Tr are degraded. Accordingly, to prevent a degradation in properties of the TFT Tr, an inorganic insulating material layer, which has an excellent interface property with the active layer 115a, may be positioned in a bottom layer of the passivation layer 130.

Figure 4E:
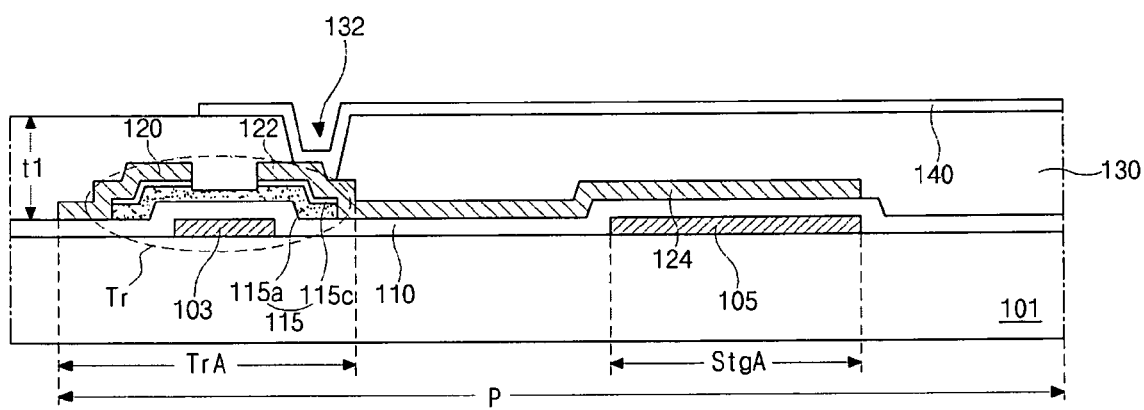
Figure 4F:
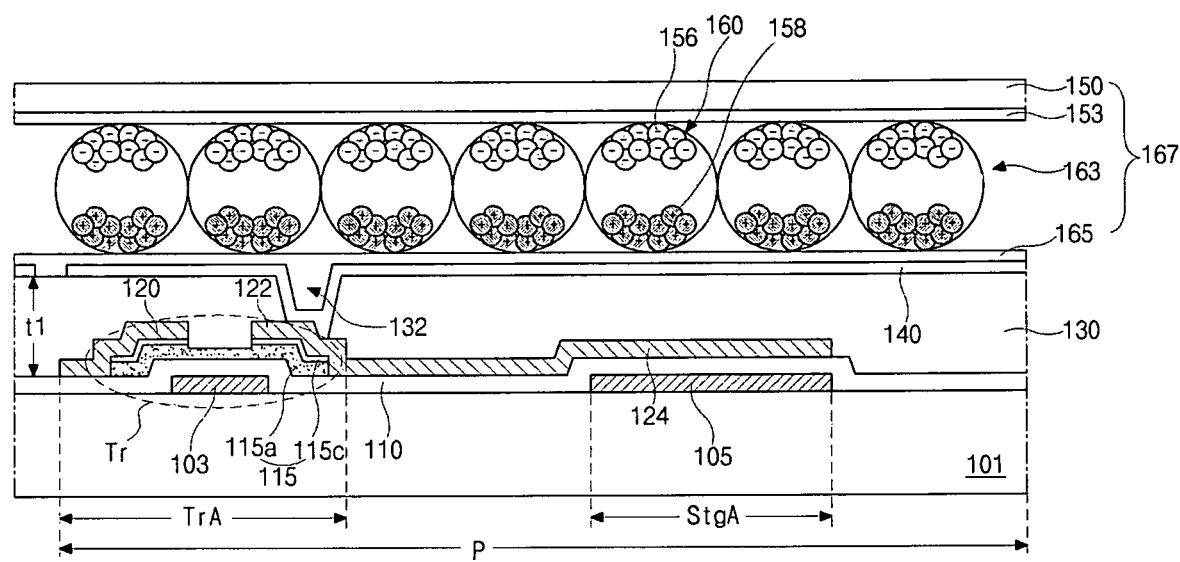
Figure 4G:
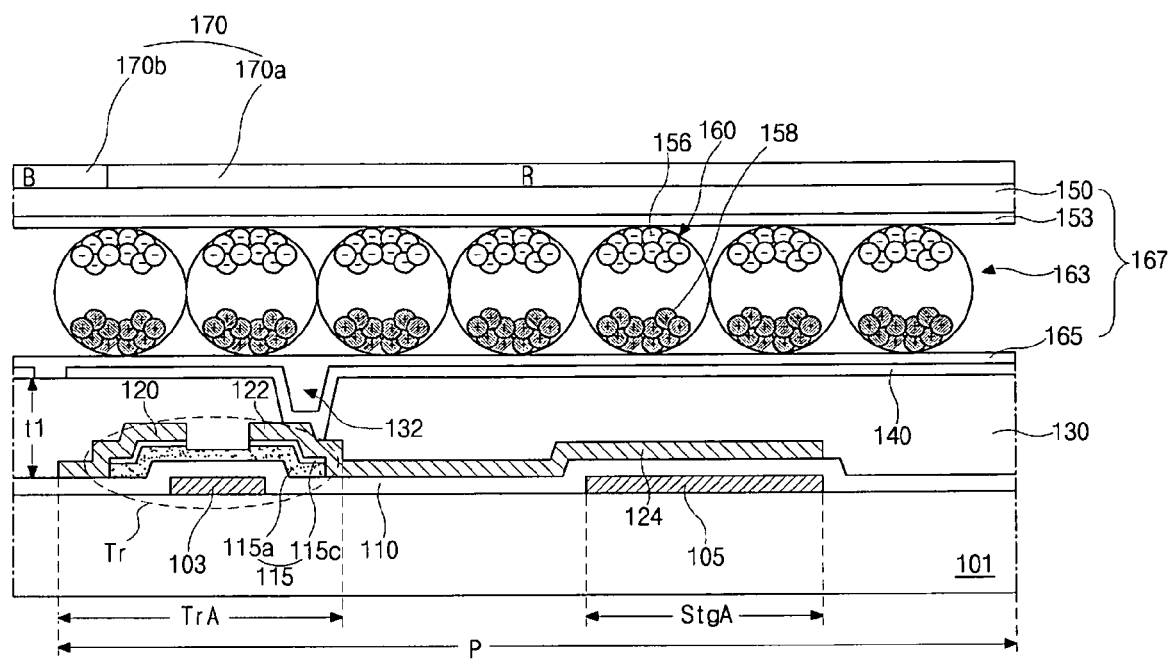
Figure 5E:
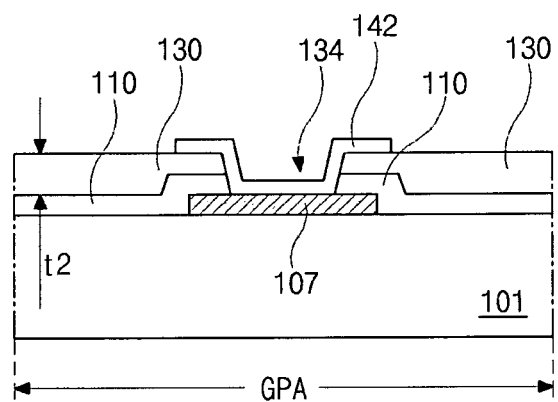
Figure 5F:
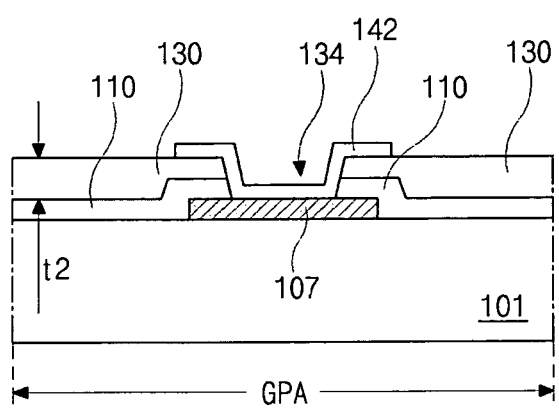
Figure 5G:
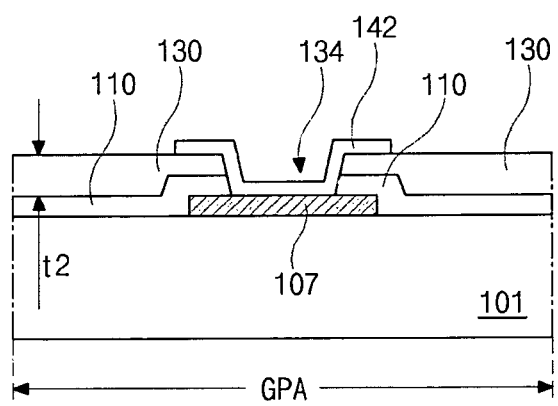
Figure 6E:
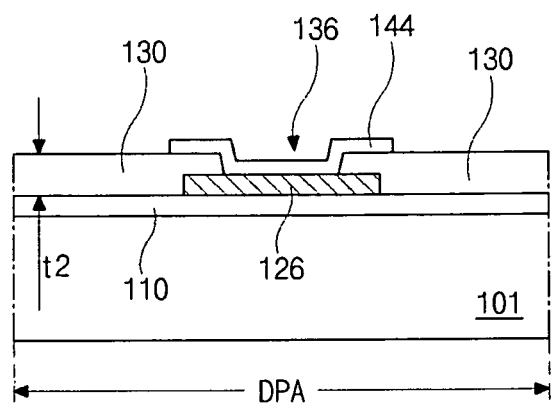
Figure 6F:
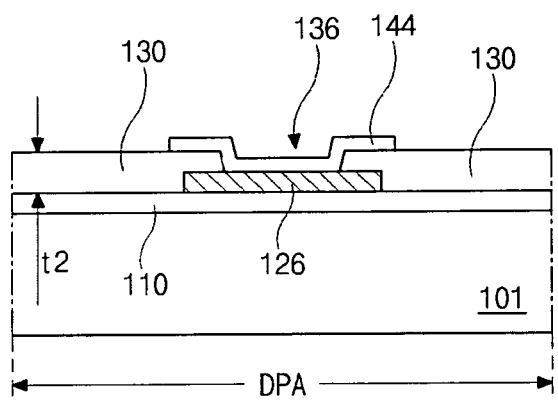
Figure 6G:
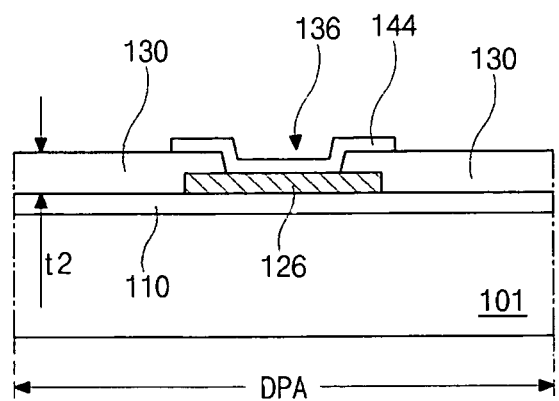

In FIGS. 4E, 5E and 6E, a transparent conductive material, for example, indium-tin-oxide (ITO) or indium-zinc-oxide (IZO) is deposited on the passivation layer 130 to form a transparent conductive material layer (not shown). Before depositing the transparent conductive material, an opaque metallic material, as a third metallic material, such as Mo, may be deposited on the passivation layer 130. In this case, a double-layered structure conductive material layer is formed on the passivation layer 130. When the align mark for aligning the color filter layer is not formed during the gate line forming step and the data line forming step, the align mark is formed by patterning the third metallic material layer. If the third metallic material layer of an opaque metallic material is not formed and the align mark is formed from the transparent conductive material, it is very difficult to use the align mark of the transparent conductive material for aligning the color filter layer.

On the other hand, the pixel electrode may include a single-layered structure of an opaque metallic material. In this case, the align mark is formed at the same layer and of the same material as the pixel electrode. Since the align mark is positioned on the passivation layer, there is an advantage in aligning the color filter layer using the align mark.

Next, the conductive material layer of a double-layered or triple-layered structure is patterned to form a pixel electrode 140 in each pixel region P, a gate auxiliary pad electrode 142 in the gate pad region GPA and a data auxiliary pad electrode 144 in the data pad region DPA. The pixel electrode 140, the gate auxiliary pad electrode 142 and the data auxiliary pad electrode 144 contact the drain electrode 122, the gate pad electrode 107 and the data pad electrode 126 through the drain contact hole 132, the gate pad contact hole 134 and the data pad contact hole 136, respectively.

When the align mark for aligning the color filter layer is not formed during the gate line forming step and the data line forming step, the align mark is formed on the passivation layer 130 in the align mark region CA by patterning the third metallic material of an opaque material during the pixel electrode patterning process.

Figure 10A:
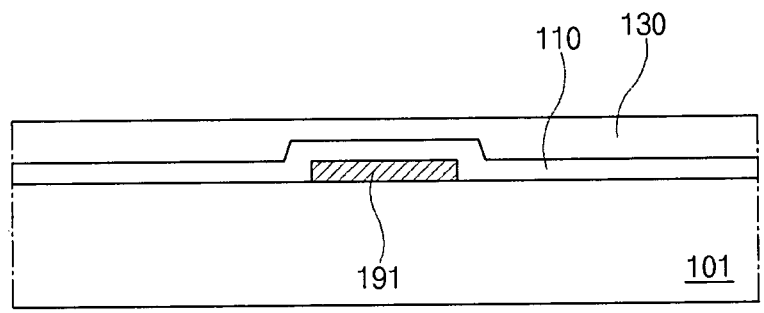
FIGS. 10A to 10C are cross-sectional views respectively showing a position of an align mark for forming a color filter layer of an electrophoretic display device according to an embodiment of the present invention.
Figure 10B:
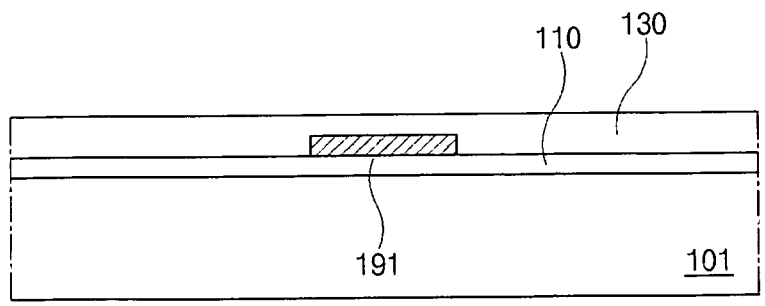
Figure 10C:
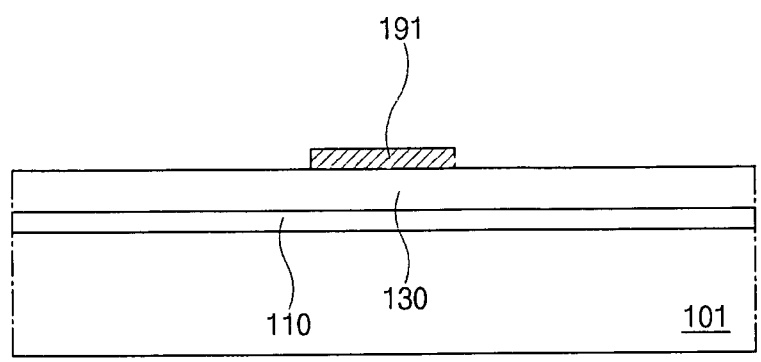

FIGS. 10A to 10C are cross-sectional views respectively showing a position of an align mark for forming a color filter layer of an electrophoretic display device according to an embodiment of the present invention. FIG. 10A shows a position of the align mark formed during a gate line forming step, FIG. 10B shows a position of the align mark formed during a data line forming step, and FIG. 10C shows a position of the align mark formed during a pixel electrode forming step.

In FIG. 10A, when the align mark 191 is formed during the gate line forming step, the align mark 191 is positioned on the substrate 101 and covered with the gate insulating layer 110. In FIG. 10B, when the align mark 191 is formed during the data line forming step, the align mark 191 is positioned on the gate insulating layer 110 and covered with the passivation layer 130. In FIG. 10C, when the align mark 191 is formed during the pixel electrode forming step, the align mark 191 is positioned on the passivation layer 130. FIGS. 10A to 10C show the align mark 191 of a single layer. However, when the gate line, the data line and the pixel electrode 140 have a double-layered or triple-layered structure, the align mark 191 also has a double-layered or triple-layered structure.

In FIGS. 4F, 5F, 6F and 7B, an electrophoresis film 167 is attached onto the pixel electrode 140. The electrophoresis film 167 corresponds to the display region DA. The electrophoresis film 167 includes a base film 150 of a transparent and flexible material, such as polyethylene terephthalate (PET), a common electrode 153 under the base film 150, an ink layer 163 under the common electrode 153 and an adhesive layer 165 under the ink layer 163. When the electrophoresis film 167 is attached onto the pixel electrode 140, the ink layer 163 is positioned between the common and pixel electrodes 153 and 140 and the adhesive layer 165 faces the pixel electrode 140. The common electrode 153 is formed of a transparent conductive material. The ink layer 163 includes a plurality of capsules 160, and each capsule 160 has a plurality of white-dyed particles 156 and a plurality black-dyed particles 158 therein. The white-dyed and black-dyed particles 156 and 158 may be negatively and positively charged by a condensation polymerization reaction, respectively.

The electrophoresis film 167 may have a different structure from the above structure. For example, the ink layer 163 may have only one of the white-dyed particle 156 and the black-dyed particle 158. Although not shown, when the ink layer 163 has only one of the white-dyed particle 156 and the black-dyed particle 158, the common electrode may be formed at the same layer as the pixel electrode on the passivation layer 130. Namely, different from the structure shown in FIG. 4F, the common electrode 153 is not formed on an entire surface of the ink layer 163. In this case, the pixel electrode has a plurality of bar shapes, and the common electrode has also a plurality of bar shapes. The bars of common electrode are alternately arranged with the bars of the pixel electrode. A common line, which is parallel to the gate line, is formed during the gate line forming step, and a common contact hole exposing a portion of the common line is formed in the passivation layer 130 and the gate insulating layer 110. The common electrode contacts the common line through the common contact hole.

The electrophoresis film 167 has a whole thickness of about 300 micrometers to about 500 micrometers. When a step difference between a layer, where the align mark 191 is formed, and a top layer of the electrophoresis film 167 is above 500 micrometers, there are some difficulty to use the align mark 191 for aligning the color filter layer which will be formed on the electrophoresis film 167.

In FIGS. 4G, 5G, 6G and 7C, a red color filter layer (not shown) is formed on the base film 150 of the electrophoresis film 167 in the display region DA by coating a red color resist. For example, the red color resist is coated by a spin coating method. After exactly aligning the red color filter layer with the align mark 191, the red color filter layer is exposed and developed by a mask process having a transmissive area, which transmits light, and a blocking area, which blocks light, to form a red (R) sub-color filter 170a. The red (R) sub-color filter 170a corresponds to some pixel regions P. Since the red color resist is a negative type, a portion of the red color filter layer, where light is irradiated, remains onto the base film 150 and a portion of the red color filter layer, where light is not irradiated, is removed.

Next, a green (G) sub-color filter 170b and a blue (B) sub-color filter 170c are formed on the base film 150 by the same process as the red (R) sub-color filter 170a forming process. The red (R), green (G) and blue (B) sub-color filters 170a, 170b and 170c are sequentially repeated. Each of the red (R), green (G) and blue (B) sub-color filters 170a, 170b and 170c is disposed in each pixel region P.

The color filter layer 170 may includes a white (W) sub-color filter with the red (R), green (G) and blue (B) sub-color filters 170a, 170b and 170c. The white (W) sub-color filter is formed by coating and pattering a colorless resist. In this case, the red (R), green (G), blue (B) and white (W) sub-color filters are disposed in four pixel regions of a matrix shape. The sub-color filters may be formed by an ink jet apparatus. With the ink jet apparatus, the sub-color filters can be formed in each pixel regions P without the pattering process for forming each sub-color filter.

Before forming the color filter layer 170, a black matrix (not shown) may be formed at a border region of each pixel region P. The black matrix may correspond to the gate line and data line. A black resin layer is coated on the base film 150, or a black-color based metallic material layer is deposited on the base film 150. The black-color based metallic material layer may be formed of chrome (Cr). The black resin layer or the black-color based metallic material layer is patterned to form the black matrix.

Figure 4H:
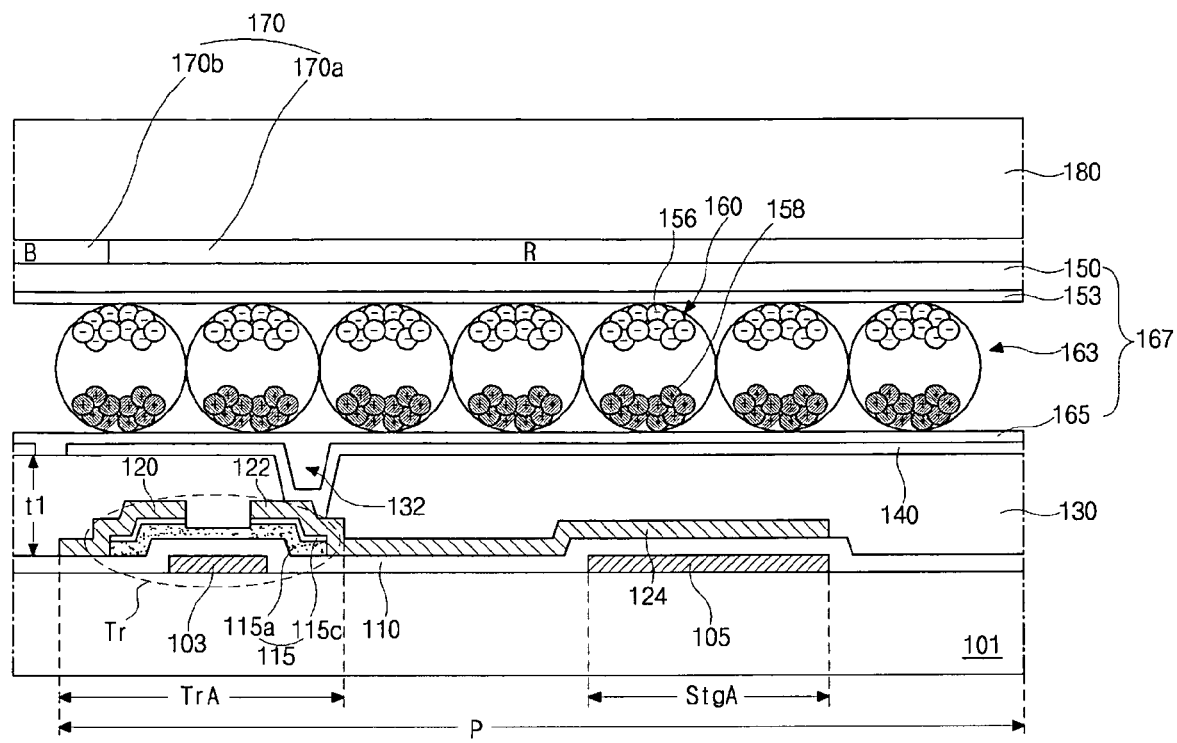
Figure 5H:
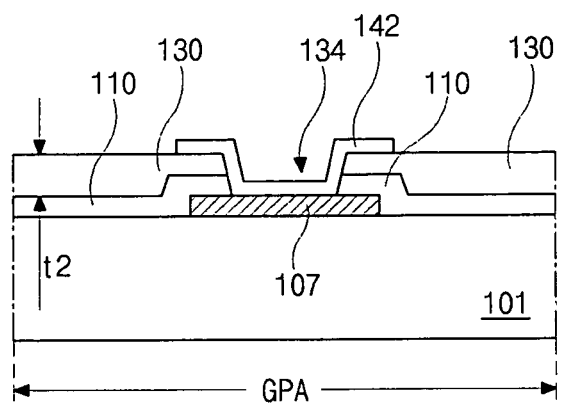
Figure 6H:
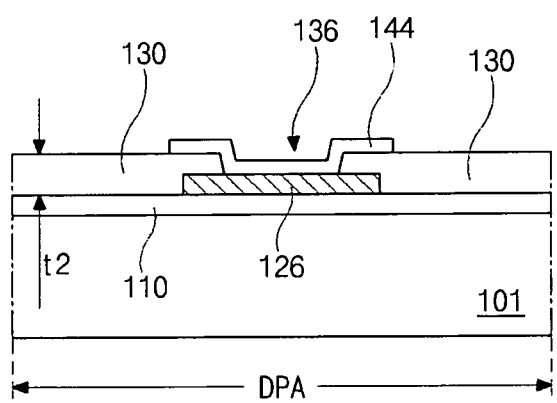

In FIGS. 4H, 5H and 6H, a passivation sheet 180 of a plastic material having a transparent and flexible property is positioned over the color filter layer 170. A seal pattern (not shown) is formed along the non-display region NA at a periphery of the display region DA. The passivation sheet 180 is attached to the substrate 101 such that the passivation layer 180 covers the display region DA. The passivation layer 180 exposes the gate auxiliary pad electrode 142 and the data auxiliary pad electrode 144.

Next, although not shown, the substrate 101 is cut along the cutting line to remove a portion CA where the align mark 191 is formed. The portion is an outer region of the non-display region NA. An ACF (not shown) is attached onto the gate auxiliary pad electrode 142 and the data auxiliary pad electrode 144, and the ACF is joined with a TCP (not shown) electrically connected to an external driving circuit substrate (not shown). By the above modulated process, an electrophoretic display device according to the present invention is obtained.

Figure 11A:
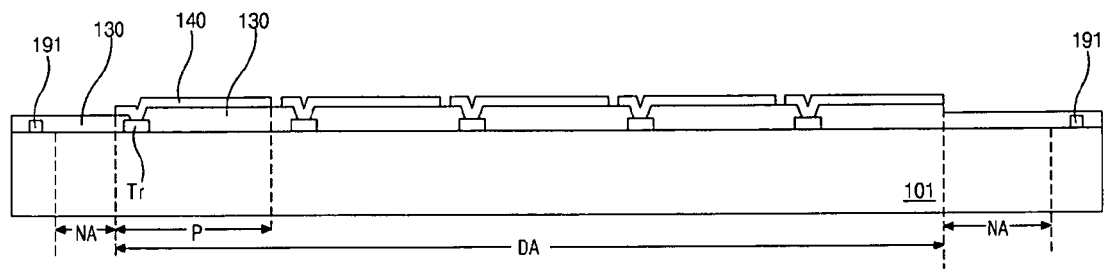
FIGS. 11A to 11C are cross-sectional views schematically showing a fabricating process for an electrophoretic display device according to an embodiment of the present invention.
Figure 11B:
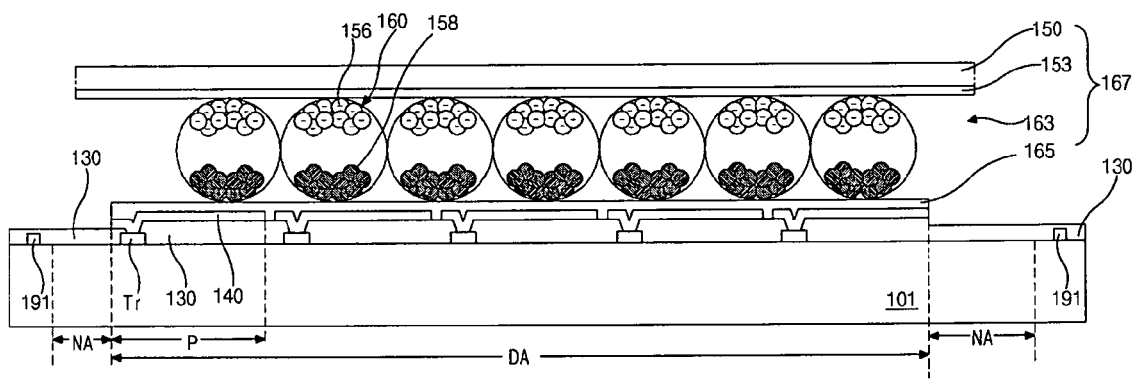
Figure 11C:
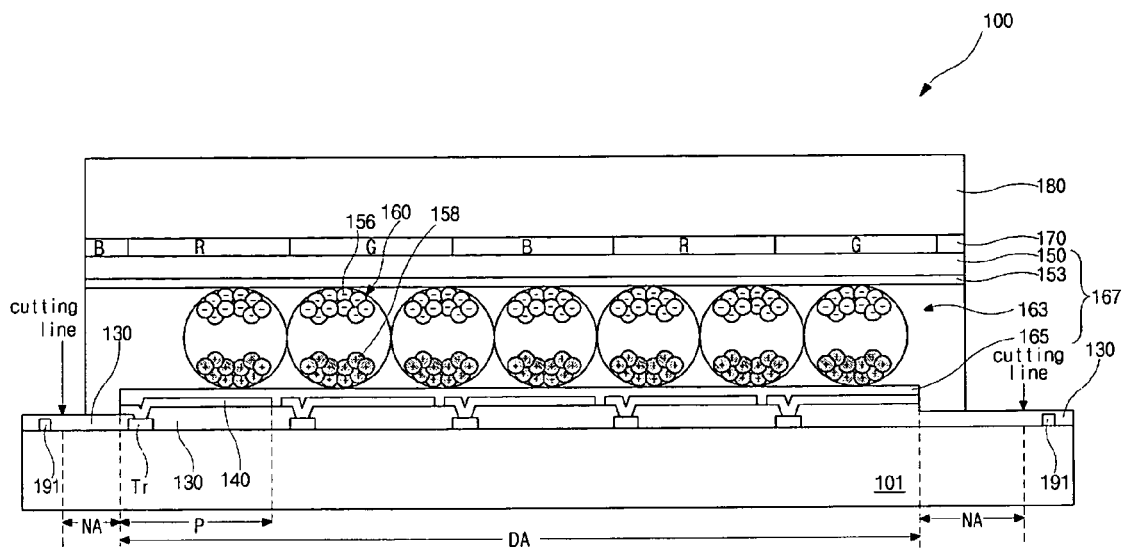

FIGS. 11A to 11C are cross-sectional views schematically showing a fabricating process for an electrophoretic display device according to an embodiment of the present invention.

In FIG. 11A, the TFT Tr, the align mark 191 for aligning the color filter layer, the passivation layer 130, which has a difference in a thickness at the display region DA and the non-display region NA, the pixel electrode 140 in each pixel region P are formed on the substrate 101. Since detailed fabricating steps for each element are already explained, explanations are omitted. In FIG. 11A, the align mark 191 is formed at a step of forming the gate line (not shown) and the gate electrode (not shown) of the TFT Tr.

In FIG. 11B, the electrophoresis film 167 including the adhesive layer 165, the ink layer 163, the common electrode 153 and the base film 150 is attached onto the substrate 101 where the pixel electrode 140 is formed. The electrophoresis film 167 corresponds to the display region DA. In FIG. 11B, the ink layer 163 includes a plurality of capsules 160, and each capsule 160 has a plurality of white-dyed particles 156 and a plurality black-dyed particles 158 therein. The white-dyed and black-dyed particles 156 and 158 may be negatively and positively charged by a condensation polymerization reaction, respectively. However, the ink layer 163 may have only one of the white-dyed particle 156 and the black-dyed particle 158. In this case, the common electrode 153 in the electrophoresis film 167 is omitted, while the common electrode is formed on the substrate 101. The common electrode may be formed at the same layer as the pixel electrode on the passivation layer 130. The pixel electrode has a plurality of bar shapes, and the common electrode has also a plurality of bar shapes. The bars of common electrode are alternately arranged with the bars of the pixel electrode.

In FIG. 11C, the color filter layer 170 including the sequentially repeated red (R), green (G) and blue (B) sub-color filters is formed on the electrophoresis film 167 using the align mark 191. The color filter layer 170 may include a white (W) sub-color filter with the red (R), green (G) and blue (B) sub-color filters. The red (R), green (G), blue (B) and white (W) sub-color filters are disposed in four pixel regions of a matrix shape.

Next, the passivation sheet 180 formed on the color filter layer 170, and a portion of the substrate 101, where the align mark 191 is formed, is removed by cutting along the cutting line. An ACF (not shown) is attached onto the gate auxiliary pad electrode 142 and the data auxiliary pad electrode 144, and the ACF is joined with a TCP (not shown) electrically connected to an external driving circuit substrate (not shown). By the above modulated process, an electrophoretic display device 100 according to the present invention is obtained.

In the above fabricating process for the electrophoretic display device, a carrier substrate, which is essential in a fabricating process for the related art electrophoretic display device, is not required. In addition, adhesive layers for attaching the carrier substrate are not required. Accordingly, production costs are reduced.

Moreover, since the color filter layer is formed directly on the electrophoresis film, a substrate for the color filter layer is not required. In this case, since a mis-aligning range (about 2 micrometers) in the electrophoretic display device according to the present invention, where the color filter layer is directly on the electrophoresis film, is smaller than a mis-aligning range (about 5 micrometers) in the related art electrophoretic display device, where the color filter layer is formed another substrate, there is an advantage in a aligning property.

Furthermore, since detaching processes for unessential elements are not required, problems, for example, scratches, can be prevented.

In addition, since the passivation layer has a difference in a thickness at the display region and the non-display region, electrical short circuit problems can be prevented and a parasitic capacitance can be minimized.

Figure 12A:
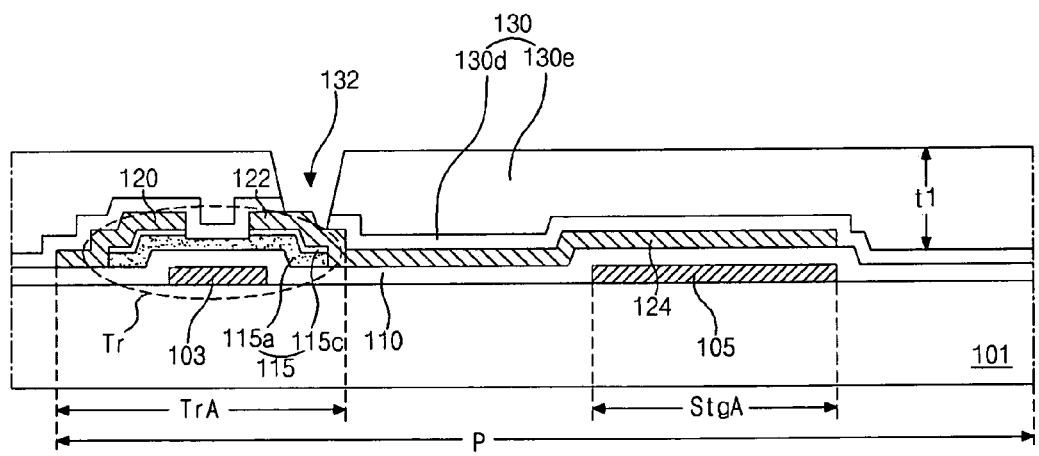
FIGS. 12A to 12C are cross-sectional views for explaining a fabricating process of a passivation layer in a pixel region, a gate pad region and a data pad region of an electrophoretic display device according to an embodiment of the present invention, respectively.
Figure 12B:
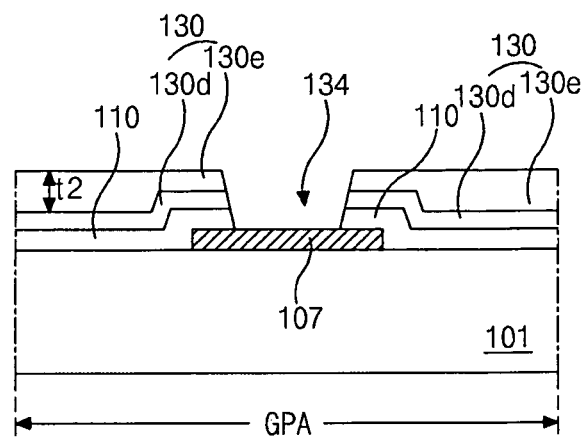
Figure 12C:
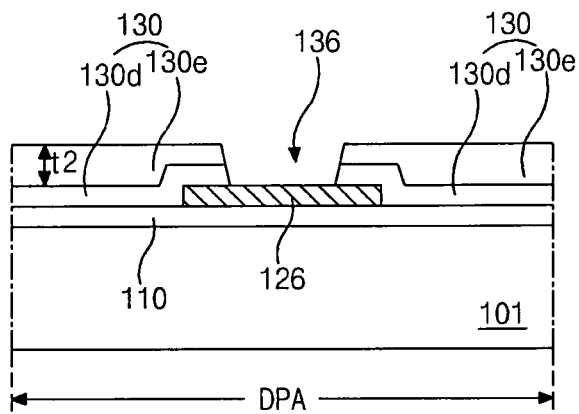

FIGS. 12A to 12C are cross-sectional views for explaining a fabricating process of a passivation layer in a pixel region, a gate pad region and a data pad region of an electrophoretic display device according to an embodiment of the present invention, respectively. Since there is only difference in a passivation layer covering a TFT, an explanation is focused in a fabricating process of the passivation layer.

Referring to FIGS. 12A to 12C, the passivation layer 130 has a double-layered structure. Although FIGS. 8A to 8C show a passivation layer 130 having a double-layered-structure, there is a difference in a stacking order. The passivation layer 130 (of FIG. 8A) in the pixel region P (of FIG. 8A) has a first layer 130a (of FIG. 8A) of an organic insulating material and a second layer 130b (of FIG. 8a) of an inorganic insulating material stacked on the first layer 130a (of FIG. 8A) in FIGS. 8A to 8C, while the passivation layer 130 in the pixel region P, the gate pad region GPA and the data pad region DPA has a first layer 130d of an inorganic insulating material and a second layer 130e of an organic insulating material stacked on the first layer 130d. For example, the first layer 130d may be formed of silicon oxide (SiO$_2$) or silicon nitride (SiNx), and the second layer 130e may be formed of benzocyclobutene (BCB) or photo-acryl.

In the electrophoretic display device in FIGS. 8A to 8C, the second layer 130b, which is formed of an inorganic insulating material, of the passivation layer 130 in the gate pad region GPA and the data pad region DPA is removed such that the passivation layer 130 in the gate pad region GPA and the data pad region DPA has a single-layered structure of the first layer 130a of an organic insulating material. Accordingly, a thickness of the passivation layer 130 in the gate and data pad regions GPA and DPA is smaller than that in the pixel region P. However, in the electrophoretic display device in FIGS. 12A to 12C, the passivation layer 130 not only in the pixel region P but also in the gate and data pad regions GPA and DPA has a double-layered structure. In this case, a thickness of the second layer 130e, which is formed of an organic insulating material, of the passivation layer 130 in the gate and data pad regions GPA and DPA is smaller than that in the pixel region P. On the other hand, the second layer 130e of the passivation layer 130 in the gate and data pad regions GPA and DPA may be perfectly removed such that the passivation layer 130 in the gate and data pad regions GPA and DPA has a single-layered structure of an inorganic insulating material.

When the passivation layer 130 has a double-layered structure with the first layer 130d as a lower layer of an inorganic insulating material and the second layer 130e as an upper layer 130e of an organic insulating material, there is no PR layer for pattering the passivation layer 130. The passivation layer 130 is directly patterned by exposing and developing the second layer 130e without the PR layer. It is because the second layer 130e of an organic insulating material is photosensitive.

Namely, a refractive exposing process or a half-tone exposing process is performed onto the passivation layer 130 having a double-layered structure of the first and second layers 130d and 130e using a scanning type exposing unit (not shown), or two steps exposing process including a blank shot is performed onto the passivation layer 130 having a double-layered structure of the first and second layers 130d and 130e using a stepper type exposing unit (not shown). Then, the second layer 130e of the passivation layer 130 is developed such that the second layer 130e of the passivation layer 130 in the display region including the pixel region P has a first thickness t1 and the second layer 130e of the passivation layer 130 in the non-display region including the gate and data pad regions GPA and DPA has a second thickness t2 smaller than the first thickness t1. In addition, a portion of the first layer 130d covering each of the drain electrode 122 in the pixel region P, the gate pad electrode 107 in the gate pad region GPA and the data pad electrode 126 in the data pad region DPA is exposed by removing the second layer 130e. Then, the exposed portion of the first layer 130d is etched such that the drain contact hole 132, the gate pad contact hole 134 and the data pad contact hole 136 respectively exposing the drain electrode 122, the gate pad electrode 107 and the data pad electrode 126 are formed through the first layer 130d. In this case, the passivation layer 130 not only in the pixel region P but also in the gate and data pad regions GPA and DPA has a double-layered structure of the first and second layers 130d and 130e.

On the other hand, when the passivation layer 130 in the non-display region has a single-layered structure, a single dry-etching process is required on the second layer 130e having different thicknesses after the refractive exposing process or the half-tone exposing process.

Namely, the second layer 130e having a first thickness t1 in the pixel region P and a second thickness t2 in the gate and data pad regions GPA and DPA is dry-etched such that the second layer 130e in the gate and data pad regions GPA and DPA are completely removed and the second layer 130e in the pixel region P has a reduced thickness. As a result, the passivation layer 130 in the pixel region P has a double-layered structure, while the passivation layer 130 in the gate and data pad regions GPA and DPA has a single-layered structure.

Since the following processes are substantially same as processes explained with reference to FIGS. 8A to 8C, explanation for following processes is omitted.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an electrophoretic display device, comprising:
    forming a gate electrode and a gate line on a substrate having a display region, a non-display region at a periphery of the display region and a cut portion at an outer region of the non-display region;
    forming a gate insulating layer on an entire surface of the substrate including the gate electrode and the gate line;
    forming a data line and a thin film transistor having a semiconductor layer, a source electrode and a drain electrode on the substrate; wherein, the gate and data lines cross each other to define pixel regions, the thin film transistor connected to the gate and data lines;
    forming a passivation layer over the thin film transistor;
    forming a pixel electrode in each pixel region on the passivation layer and connected, via a contact hole, to the drain electrode of the thin film transistor;
    forming an align mark of an opaque metallic material in the cut portion;

attaching an electrophoresis film including an adhesive layer, an ink layer having a charged particle, a common electrode and a base film onto the pixel electrode, the ink layer disposed between the adhesive layer and the base film, the adhesive layer being on the pixel electrode, the charged particle including a negatively-charged sub-particle having a white color and a positively-charged sub-particle having a black color;

forming a color filter layer on the base film using the align mark for aligning the color filter layer with the pixel regions, the color filter layer corresponding to the display region; and forming a passivation sheet on the color filter layer and corresponding to the display region, wherein the step of forming the align mark is simultaneously performed with the step of forming the pixel electrode.

2. The method according to claim 1, further comprising removing the cut portion after the step of forming the passivation sheet.

3. The method according to claim 1, further comprising:
forming a gate pad electrode on the substrate in the non-display region; and
forming a data pad electrode on the gate insulating layer in the non-display region,
wherein the gate pad electrode and the data pad electrode are respectively connected to an end of the gate line and an end of the data line.

4. The method according to claim 3, wherein the passivation layer includes a drain contact hole exposing the drain electrode, a gate pad contact hole exposing the gate pad electrode and a data pad contact hole exposing the data pad electrode.

5. The method according to claim 4, wherein the passivation layer includes a double-layered structure having an organic insulating material layer and an inorganic insulating material layer, the organic insulating material layer in the display region is thicker than the organic insulating material layer in the non-display region.

6. The method according to claim 5, wherein the step of forming the pixel electrode includes forming a gate auxiliary pad electrode contacting the gate pad electrode through the gate pad contact hole and a data auxiliary pad electrode contacting the data pad electrode through the data pad contact hole.

7. The method according to claim 1, wherein the align mark includes first, second and third sub-align marks in three sides.

8. The method according to claim 1, wherein the align mark has a position being directly on the passivation layer.

9. An electrophoretic display device, comprising:
a gate line on a substrate having a display region, where a plurality of pixel regions are defined, and a non-display region at a periphery of the display region;
a gate pad electrode in the non-display region on the substrate and connected to an end of the gate line;
a gate insulating layer on an entire surface of the substrate including the gate line;
a data line crossing the gate line to define the pixel regions;
a thin film transistor including a gate electrode connected to the gate line, a semiconductor layer on the gate insulating layer and corresponding to the gate electrode, a source electrode connected to the data line and disposed on the semiconductor layer and a drain electrode spaced apart form the source electrode and disposed on the semiconductor layer;
a data pad electrode in the non-display region on the gate insulating layer and connected to an end of the data line;
a passivation layer including a drain contact hole, a gate pad contact hole and a data pad contact hole over the thin film transistor, the passivation layer has a first thickness from the substrate in the display region and a second thickness, which is smaller than the first thickness, from the substrate in the non-display region, the drain contact hole, the gate pad contact hole and the data pad contact hole exposing the drain electrode, the gate pad electrode and the data pad electrode, respectively, the passivation layer includes a double-layered structure having an organic insulating material layer and an inorganic insulating material layer directly on the organic insulating material, the organic insulating material layer in the display region is thicker than the organic insulating material layer in the non-display region;
a pixel electrode on the passivation layer in each pixel region and contacting the drain electrode through the drain contact hole;
an electrophoresis film on the pixel electrode and corresponding to the display region;
a color filter layer on the electrophoresis film; and
a passivation sheet on the color filter layer.

10. The display device according to claim 9, wherein the electrophoresis film includes an adhesive layer on the pixel electrode, an ink layer having a charged particle on the adhesive layer, a common electrode on the ink layer and a base film on the common electrode.

11. The display device according to claim 10, wherein the charged particle includes a negatively-charged sub-particle having a white color and a positively-charged sub-particle having a black color in each of a plurality of capsules.

12. The display device according to claim 9, further comprising:
a first storage electrode in the display region and on the substrate; and
a second storage electrode in the display region and on the gate insulating layer.

13. The display device according to claim 9, further comprising:
a gate auxiliary pad electrode in the non-display region on the passivation layer, the gate auxiliary pad electrode contacting the gate pad electrode through the gate pad contact hole;
a data auxiliary pad electrode in the non-display region on the passivation layer, the data auxiliary pad electrode contacting the data pad electrode through the data pad contact hole; and
a conductive ball connecting an external driving circuit to at least one of the gate auxiliary pad electrode and the data auxiliary pad electrode.

14. An electrophoretic display device, comprising:
a gate line on a substrate having a display region, where a plurality of pixel regions are defined, and a non-display region at a periphery of the display region;
a gate pad electrode in the non-display region on the substrate and connected to an end of the gate line;
a gate insulating layer on an entire surface of the substrate including the gate line;
a data line crossing the gate line to define the pixel regions;
a thin film transistor including a gate electrode connected to the gate line, a semiconductor layer on the gate insulating layer and corresponding to the gate electrode, a source electrode connected to the data line and disposed on the semiconductor layer and a drain electrode spaced apart form the source electrode and disposed on the semiconductor layer;

a data pad electrode in the non-display region on the gate insulating layer and connected to an end of the data line;

a passivation layer including a drain contact hole, a gate pad contact hole and a data pad contact hole over the thin film transistor, the passivation layer has a first thickness in the display region and a second thickness smaller than the first thickness in the non-display region, the drain contact hole, the gate pad contact hole and the data pad contact hole exposing the drain electrode, the gate pad electrode and the data pad electrode, respectively, the passivation layer includes a triple-layered structure having a first inorganic insulating material layer, an organic insulating material layer directly on the first inorganic insulating material layer and a second inorganic insulating material layer directly on the organic insulating material player in the display region and a double-layered structure having the first inorganic insulating material layer and the organic insulating material layer directly on the inorganic insulating material layer in the non-display region;

a pixel electrode on the passivation layer in each pixel region and contacting the drain electrode through the drain contact hole;

an electrophoresis film on the pixel electrode and corresponding to the display region;

a color filter layer on the electrophoresis film; and a passivation sheet on the color filter layer.

15. The display device according to claim 14, wherein the electrophoresis film includes an adhesive layer on the pixel electrode, an ink layer having a charged particle on the adhesive layer, a common electrode on the ink layer and a base film on the common electrode.

16. The display device according to claim 15, wherein the charged particle includes a negatively-charged sub-particle having a white color and a positively-charged sub-particle having a black color in each of a plurality of capsules.

17. The display device according to claim 14, further comprising:

a first storage electrode in the display region and on the substrate; and a second storage electrode in the display region and on the gate insulating layer.

18. The display device according to claim 14, further comprising:

a gate auxiliary pad electrode in the non-display region on the passivation layer, the gate auxiliary pad electrode contacting the gate pad electrode through the gate pad contact hole;

a data auxiliary pad electrode in the non-display region on the passivation layer, the data auxiliary pad electrode contacting the data pad electrode through the data pad contact hole; and a conductive ball connecting an external driving circuit to at least one of the gate auxiliary pad electrode and the data auxiliary pad electrode.

19. A method of fabricating an electrophoretic display device, comprising:

forming a thin film transistor on a substrate including a display region, non-display region at a periphery of the display region and a cut region at an outer side of the non-display region;

forming a passivation layer covering the thin film transistor;

forming a pixel electrode on the passivation layer and connected to the thin film transistor;

forming an align mark of an opaque metallic material in the cut region;

attaching an electrophoresis film including an adhesive layer, an ink layer having a charged particle, a common electrode and a base film such that the adhesive layer contacts the pixel electrode; and directly forming a color filter layer on the electrophoresis film using the align mark for aligning the color filter layer, wherein the step of forming the align mark is simultaneously performed with the step of forming the pixel electrode.

20. The method according to claim 19, wherein the step of forming the thin film transistor includes:

forming a gate line on the substrate and connected to the thin film transistor;

forming a gate insulating layer covering the gate line; and forming a data line on the gate insulating layer and connected to the thin film transistor, the data line crossing the gate line to define a pixel region in the display region.

21. The method according to claim 19, wherein the step of forming the passivation layer includes:

forming an organic insulating material covering the thin film transistor and an entire surface of the display region and the non-display region and having a first thickness; and etching a portion of the organic insulating layer in the non-display region such that the passivation layer has the first thickness in the display region and a second thickness, which is smaller than the first thickness, in the non-display region.

22. The method according to claim 19, wherein the color filter layer is formed through a photolithography process or using an inkjet apparatus.

23. An electrophoretic display device, comprising:

a thin film transistor on a substrate including a display region, non-display region at a periphery of the display region and a cut region at an outer side of the non-display region, the thin film transistor positioned in the display region;

a passivation layer covering the thin film transistor and having a first thickness in the display region and a second thickness, which is smaller than the first thickness, in the non-display region;

a pixel electrode on the passivation layer and connected to the thin film transistor, the pixel electrode perfectly covering the thin film transistor;

an electrophoresis film attached to the pixel electrode and covering the display region; and a color filter layer formed on the electrophoresis film.

24. The device according to claim 23, the pixel electrode includes a first layer an opaque material and a second layer of a transparent conductive material on the first layer.

25. The device according to claim 23, further comprising:

gate and data lines connected to the thin film transistor;

a gate pad electrode connected to the gate line and positioned in the non-display region; and a data pad electrode connected to the data line and positioned in the non-display region, wherein the passivation layer includes a gate pad contact hole exposing the gate pad electrode and a data pad contact hole exposing the data pad electrode.

26. The device according to claim 25, wherein the passivation layer in the display region has a double-layered structure of an inorganic insulating material layer and a first organic insulating material layer on the inorganic insulating material layer and having a third thickness, and the passivation layer in the non-display region has a single-layered structure of the inorganic insulating material layer or a double-layered structure of the inorganic insulating material layer and a second organic insulating material layer on the inorganic insulating material layer and having a fourth thickness smaller than the third thickness.

27. The device according to claim 25, wherein the passivation layer in the display region has a double-layered structure of a first organic insulating material layer having a third thickness and an inorganic insulating material layer on the first organic insulating material layer, and the passivation layer in the non-display region has a single-layered structure of a second organic insulating material layer having a fourth thickness smaller than the third thickness.

28. The device according to claim 25, wherein the passivation layer in the display region has a triple-layered structure of a first inorganic insulating material layer, a first organic insulating layer having a third thickness, and a second inorganic insulating material layer, and the passivation layer in the non-display region has a double-layered structure of the first inorganic insulating material layer and a second organic insulating material layer having a fourth thickness smaller than the third thickness.

29. The device according to claim 25, wherein the passivation layer in the display region has a triple-layered structure of a first inorganic insulating material layer, an organic insulating layer, and a second inorganic insulating material layer, and the passivation layer in the non-display region has a single-layered structure of the first organic insulating material layer.

* * * * *